US009686845B2

(12) United States Patent
Suzuki et al.

(10) Patent No.: US 9,686,845 B2
(45) Date of Patent: Jun. 20, 2017

(54) EXTREME ULTRAVIOLET LIGHT GENERATION APPARATUS

(71) Applicant: GIGAPHOTON INC., Tochigi (JP)

(72) Inventors: Toru Suzuki, Oyama (JP); Takayuki Yabu, Oyama (JP)

(73) Assignee: GIGAPHOTON INC., Tochigi (JP)

( * ) Notice: Subject to any disclaimer, the term of this patent is extended or adjusted under 35 U.S.C. 154(b) by 0 days.

(21) Appl. No.: 15/361,120

(22) Filed: Nov. 25, 2016

(65) Prior Publication Data

US 2017/0079126 A1 Mar. 16, 2017

Related U.S. Application Data

(63) Continuation of application No. PCT/JP2015/070552, filed on Jul. 17, 2015.

(30) Foreign Application Priority Data

Jul. 25, 2014 (WO) .................. PCT/JP2014/069645

(51) Int. Cl.
*G01J 1/42* (2006.01)
*H05G 2/00* (2006.01)

(52) U.S. Cl.
CPC ............. *H05G 2/006* (2013.01); *H05G 2/008* (2013.01)

(58) Field of Classification Search
CPC ........ H05G 2/008; H05G 2/005; H05G 2/006; H01J 37/3045; H01J 37/228; H01J 2237/20292

(Continued)

(56) References Cited

U.S. PATENT DOCUMENTS 7,068,367 B2 6/2006 Stobrawa et al.
7,589,337 B2 9/2009 Bykanov et al.
(Continued)

FOREIGN PATENT DOCUMENTS

JP 2004-303725 A 10/2004
JP 2005-310453 A 11/2005
(Continued)

OTHER PUBLICATIONS

International Search Report; PCT/JP2015/070552 mailed Oct. 13, 2015.

*Primary Examiner* — David Porta
*Assistant Examiner* — Meenakshi Sahu
(74) *Attorney, Agent, or Firm* — Studebaker & Brackett PC

(57) ABSTRACT

A target sensor may include: a plurality of sensor elements, each of the plurality of sensor elements being configured to output a sensor signal that varies in accordance with an amount of light received on a light-receiving surface; and a signal generator configured to process the sensor signals from the plurality of sensor elements. The light-receiving surfaces of the plurality of sensor elements may be disposed at different positions in a second direction different from a first direction along which an image of the target illuminated by the illumination light may move. The signal generator may be configured to compare each of the sensor signals from the plurality of sensor elements with a threshold and output the signal indicating detection of a target to the controller in a case where at least one of the sensor signals from the plurality of sensor elements may exceed the threshold.

21 Claims, 19 Drawing Sheets

(58) Field of Classification Search
USPC .............................................. 250/504 R, 372
See application file for complete search history.

(56) References Cited

U.S. PATENT DOCUMENTS

| | | | | |
|---|---|---|---|---|
| 2004/0195529 | A1 | 10/2004 | Hergenhan et al. | |
| 2006/0192156 | A1 | 8/2006 | Hasegawa | |
| 2010/0294958 | A1* | 11/2010 | Hayashi | H05G 2/006 250/504 R |
| 2012/0080584 | A1 | 4/2012 | Partlo et al. | |
| 2012/0305811 | A1 | 12/2012 | Wakabayashi et al. | |
| 2012/0307851 | A1 | 12/2012 | Hori et al. | |
| 2013/0062539 | A1 | 3/2013 | Hayashi et al. | |
| 2014/0111635 | A1 | 4/2014 | Suzuki et al. | |
| 2015/0043599 | A1 | 2/2015 | Yanagida et al. | |
| 2015/0189730 | A1* | 7/2015 | Moriya | H05G 2/005 250/574 |
| 2016/0234920 | A1* | 8/2016 | Suzuki | H05G 2/003 |

FOREIGN PATENT DOCUMENTS

| | | | |
|---|---|---|---|
| JP | 2006-128157 | A | 5/2006 |
| JP | 2011-003887 | A | 1/2011 |
| JP | 2014-086523 | A | 5/2014 |
| WO | 2013/161760 | A1 | 10/2013 |
| WO | 2014/042003 | A1 | 3/2014 |

* cited by examiner

EXTREME ULTRAVIOLET LIGHT GENERATION APPARATUS

CROSS-REFERENCE TO RELATED APPLICATIONS

The present application is a continuation application of International Application No. PCT/JP2015/070552 filed on Jul. 17, 2015, which claims priority from International application No. PCT/JP2014/069645 filed Jul. 25, 2014, the content of which is hereby incorporated by reference into this application.

BACKGROUND

1. Technical Field

The present disclosure relates to an extreme ultraviolet light generation system.

2. Related Art

In recent years, semiconductor production processes have become capable of producing semiconductor devices with increasingly fine feature sizes, as photolithography has been making rapid progress toward finer fabrication. In the next generation of semiconductor production processes, microfabrication with feature sizes at 70 nm to 45 nm, and further, microfabrication with feature sizes of 32 nm or less will be required. In order to meet the demand for microfabrication with feature sizes of 32 nm or less, for example, an exposure apparatus is needed in which a system for generating extreme ultraviolet (EUV) light at a wavelength of approximately 13 nm is combined with a reduced projection reflective optical system.

Three kinds of systems for generating EUV light are known in general, which include a Laser Produced Plasma (LPP) type system in which plasma is generated by irradiating a target material with a laser beam, a Discharge Produced Plasma (DPP) type system in which plasma is generated by electric discharge, and a Synchrotron Radiation (SR) type system in which orbital radiation is used to generate plasma.

SUMMARY

An example of the present disclosure may be an extreme ultraviolet light generation apparatus configured to generate extreme ultraviolet light by irradiating a target with a pulse laser beam outputted from a laser apparatus to generate plasma. The extreme ultraviolet light generation apparatus may include: a target supply device configured to supply a target; a timing sensor configured to detect a target supplied from the target supply device and passing through a predetermined region; and a controller configured to control the laser apparatus in accordance with a signal indicating detection of the target and received from the timing sensor. The timing sensor may include: a light-emitting unit configured to illuminate the predetermined region with illumination light; and a target sensor configured to receive the illumination light from the light-emitting unit. The target sensor may include: a plurality of sensor elements, each of the plurality of sensor elements being configured to output a sensor signal that varies in accordance with an amount of light received on a light-receiving surface; and a signal generator configured to process the sensor signals from the plurality of sensor elements. The light-receiving surfaces of the plurality of sensor elements may be disposed at different positions in a second direction different from a first direction along which an image of the target illuminated by the illumination light may move. The signal generator may be configured to compare each of the sensor signals from the plurality of sensor elements with a threshold and output the signal indicating detection of a target to the controller in a case where at least one of the sensor signals from the plurality of sensor elements may exceed the threshold.

BRIEF DESCRIPTION OF THE DRAWINGS

Hereinafter, selected embodiments of the present disclosure will be described with reference to the accompanying drawings.

DETAILED DESCRIPTION

Contents

Figure 1:
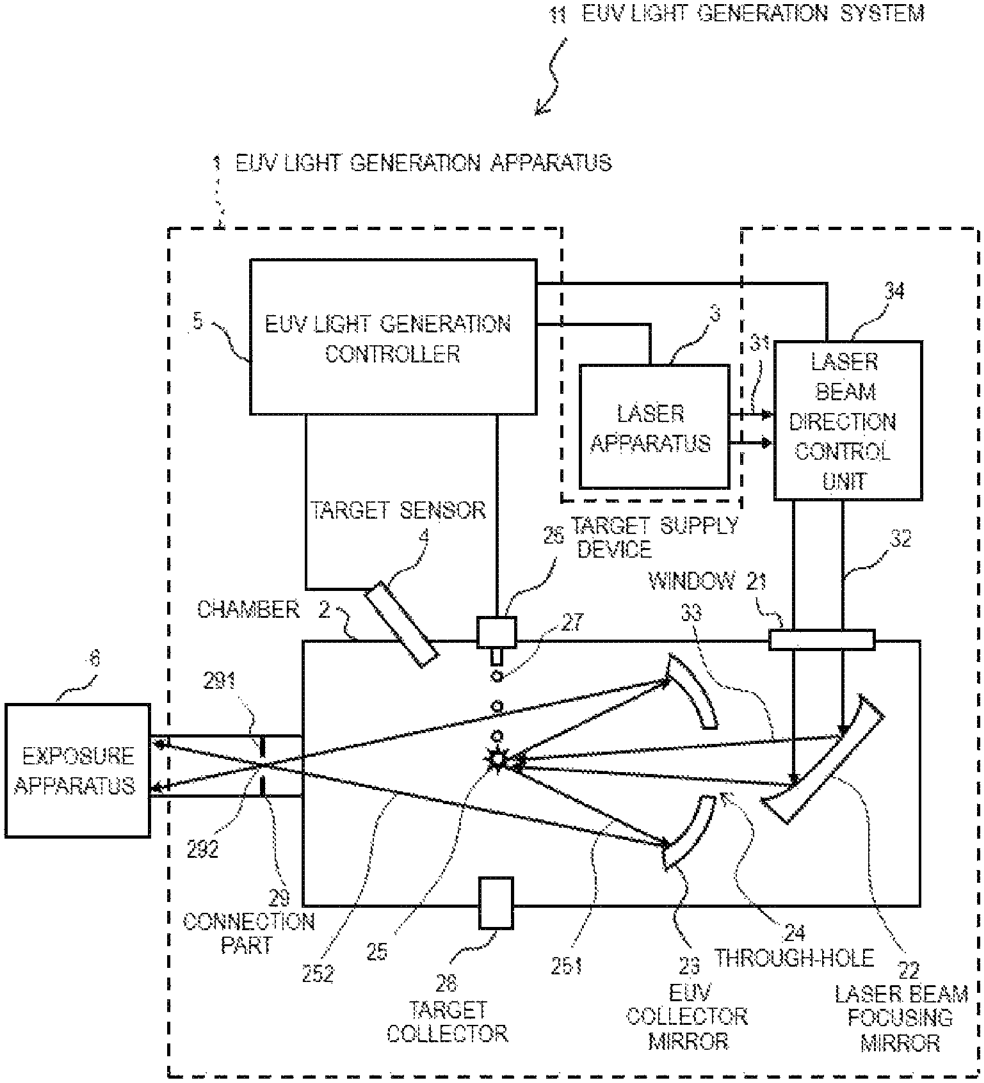
FIG. 1 schematically illustrates an exemplary configuration of an LPP type EUV light generation system.

1. Overview
2. Terms
3. Overview of EUV Light Generation System
  3.1 Configuration
  3.2 Operation
4. Control of Laser Apparatus using Timing Sensor
  4.1 Configuration of EUV Light Generation System
  4.2 Operation
5. Timing Sensor
  5.1 Configuration
  5.2 Operation
  5.3 Issues in Related Art
6. Timing Sensor in Embodiment 1
  6.1 Configuration
  6.2 Operation
  6.3 Effects
7. Timing Sensor in Embodiment 2 (Slit)
  7.1 Issues
  7.2 Configuration
  7.3 Effects
8. Timing Sensor in Embodiment 3 (Multiple Thresholds)
  8.1 Configuration and Operation
  8.2 Effects
9. Timing Sensor in Embodiment 4 (Multi-Row Light-Receiving Surfaces)
  9.1 Arrangement of Light-Receiving Surfaces
  9.1.1 Configuration
  9.1.2 Effects
  9.2 Timing Control
  9.2.1 Configuration
  9.2.2 Operation
  9.2.3. Effects
10. Timing Sensor in Embodiment 5 (Split in Z-Axis Direction)
  10.1 Configuration and Operation
  10.2 Effects
11. Timing Sensor in Embodiment 6 (Split in Y-Axis Direction)
  11.1 Configuration and Operation
  11.2 Effects
12. Timing Sensor in Embodiment 7 (Detection of Reflection)
13. Timing Sensor in Embodiment 8
  13.1 Configuration of Timing Sensor
  13.2 Configuration of Illumination Optical System
  13.3 Operation
  13.4 Effects
14. Timing Sensor in Embodiment 9
  14.1 Overview
  14.2 Configurations of Line Filter
  14.3 Example of Positions of Line Filters
  14.4 Another Example of Position of Line Filter
  14.5 Effects Hereinafter, selected embodiments of the present disclosure will be described in detail with reference to the accompanying drawings. The embodiments to be described below are merely illustrative in nature and do not limit the scope of the present disclosure. Further, the configuration(s) and operation(s) described in each embodiment are not all essential in implementing the present disclosure. Note that like elements are referenced by like reference numerals and characters, and duplicate descriptions thereof will be omitted herein.

1. Overview

An LPP type EUV light generation system may generate EUV light by supplying droplet targets from a target supply device and irradiating the droplets that have reached a plasma generation region with a pulse laser beam to make the droplets turn into plasma.

A timing sensor may output a passage timing signal upon detection of passage of a droplet. In the EUV light generation system, a laser apparatus may output a laser beam synchronously with the passage timing signal to irradiate the droplet with the pulse laser beam.

There may be a demand to reduce the diameter of the droplet. Reducing the diameter of the droplet may reduce the debris from the droplet. However, reducing the diameter of the droplet or expanding the detection range for a droplet may degrade the S/N ratio of the droplet detection signal, so that accurate detection of a droplet may become difficult.

In an aspect of the present disclosure, a timing sensor may include a plurality of sensor elements and a signal generator for processing sensor signals from the plurality of sensor elements. The light-receiving surfaces of the plurality of sensor elements may be disposed at different positions in a direction different from the direction the images of targets move along. The signal generator may compare each of the sensor signals of the plurality of sensor elements with a threshold and output a target detection pulse when at least one of the sensor signals from the plurality of sensor elements exceeds the threshold.

In an aspect of the present disclosure, the S/N ratio of the sensor signal of the timing sensor may improve to enable detection of a small-diameter droplet or expansion of the droplet detection range.

2. Terms

Terms used in the present description will be described hereinafter. An array means a group of arrayed elements. The image of a target means the image of the shadow (also merely referred to as shadow) of the target in illumination light or the image of reflection off the target.

3. Overview of Euv Light Generation System

3.1 Configuration

FIG. 1 schematically illustrates an exemplary configuration of an LPP type EUV light generation system. An EUV light generation apparatus 1 may be used with at least one laser apparatus 3. Hereinafter, a system that includes the EUV light generation apparatus 1 and the laser apparatus 3 may be referred to as an EUV light generation system 11. As shown in FIG. 1 and described in detail below, the EUV light generation system 11 may include a chamber 2 and a target supply device 26.

The chamber 2 may be sealed airtight. The target supply device 26 may be mounted onto the chamber 2, for example, to penetrate a wall of the chamber 2. A target material to be supplied by the target supply device 26 may include, but is not limited to, tin, terbium, gadolinium, lithium, xenon, or any combination thereof.

The chamber 2 may have at least one through-hole formed in its wall, a window 21 may be installed in the through-hole, and the pulse laser beam 32 from the laser apparatus 3 may travel through the window 21. An EUV collector mirror 23 having a spheroidal surface may, for example, be provided in the chamber 2. The EUV collector mirror 23 may have a first focus and a second focus.

The EUV collector mirror 23 may have a multi-layered reflective film including alternately laminated molybdenum layers and silicon layers formed on the surface thereof. The EUV collector mirror 23 is preferably positioned such that the first focus lies in a plasma generation region 25 and the second focus lies in an intermediate focus (IF) region 292. The EUV collector mirror 23 may have a through-hole 24 formed at the center thereof and a pulse laser beam 33 may travel through the through-hole 24.

The EUV light generation apparatus 1 may include an EUV light generation controller 5 and a target sensor 4. The target sensor 4 may have an imaging function and detect at least one of the presence, trajectory, position, and speed of a target 27.

Further, the EUV light generation system 11 may include a connection part 29 for allowing the interior of the chamber 2 to be in communication with the interior of the exposure apparatus 6. A wall 291 having an aperture may be provided in the connection part 29. The wall 291 may be positioned such that the second focus of the EUV collector mirror 23 lies in the aperture.

The EUV light generation apparatus 1 may also include a laser beam direction control unit 34, a laser beam focusing mirror 22, and a target collector 28 for collecting targets 27. The laser beam direction control unit 34 may include an optical element for defining the direction and an actuator for adjusting the position, the orientation or posture, and the like of the optical element.

3.2 Operation

With reference to FIG. 1, a pulse laser beam 31 outputted from the laser apparatus 3 may pass through the laser beam direction control unit 34 and, as the pulse laser beam 32, travel through the window 21 and enter the chamber 2. The pulse laser beam 32 may travel inside the chamber 2 along at least one beam path, be reflected by the laser beam focusing mirror 22, and strike at least one target 27 as a pulse laser beam 33.

The target supply device 26 may be configured to output the target(s) 27 toward the plasma generation region 25 in the chamber 2. The target 27 may be irradiated with at least one pulse of the pulse laser beam 33. Upon being irradiated with the pulse laser beam, the target 27 may be turned into plasma, and rays of light 251 may be emitted from the plasma.

The EUV light 252 included in the light 251 may be reflected selectively by the EUV collector mirror 23. EUV light 252 reflected by the EUV collector mirror 23 may be focused at the intermediate focus region 292 and be outputted to the exposure apparatus 6. Here, the target 27 may be irradiated with multiple pulses included in the pulse laser beam 33.

The EUV light generation controller 5 may be configured to integrally control the EUV light generation system 11. The EUV light generation controller 5 may be configured to process image data of the target 27 captured by the target sensor 4. Further, the EUV light generation controller 5 may be configured to control: the timing when the target 27 is outputted and the direction into which the target 27 is outputted, for example.

Furthermore, the EUV light generation controller 5 may be configured to control at least one of: the timing when the laser apparatus 3 oscillates, the direction in which the pulse laser beam 33 travels, and the position at which the pulse laser beam 33 is focused. It will be appreciated that the various controls mentioned above are merely examples, and other controls may be added as necessary.

4. Control of Laser Apparatus Using Timing Sensor

4.1 Configuration of EUV Light Generation System

Figure 2:
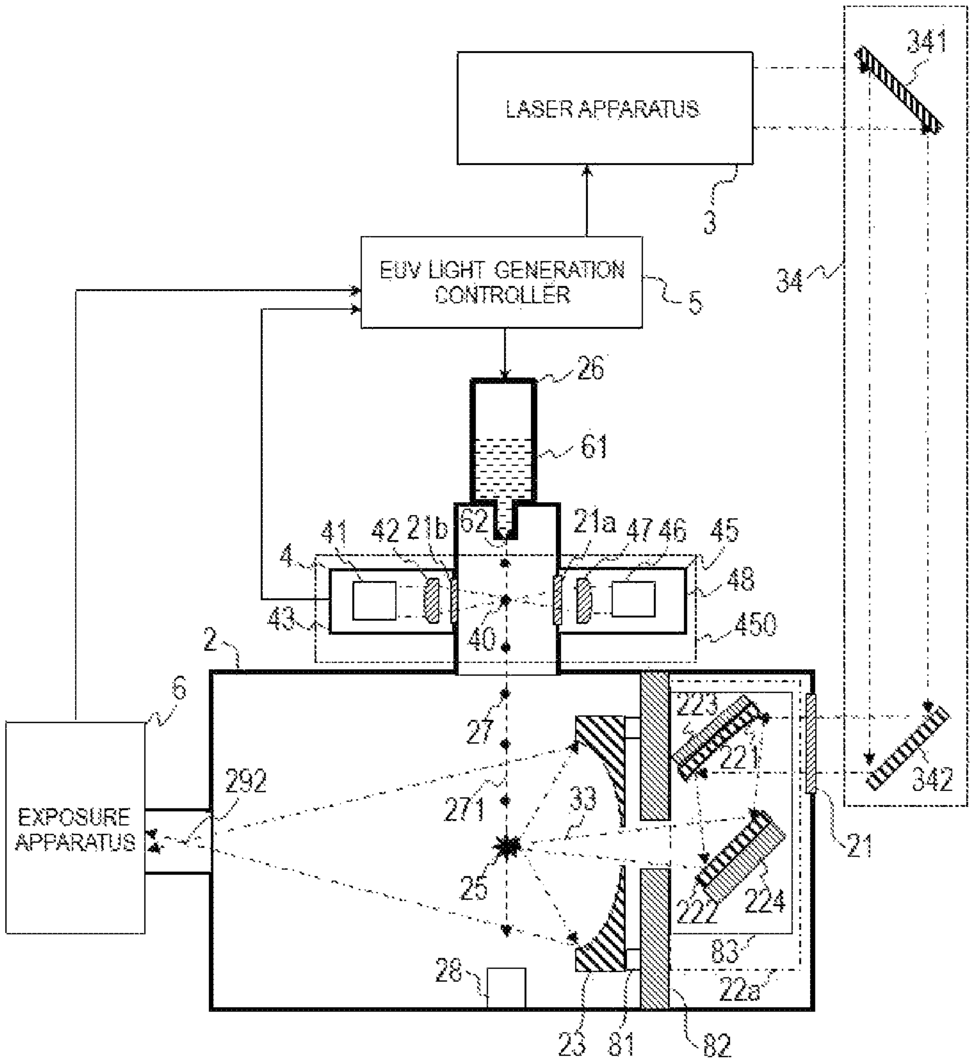
FIG. 2 is a partial cross-sectional diagram of a configuration of an EUV light generation system.

FIG. 2 is a partial cross-sectional diagram of a configuration example of the EUV light generation system 11. As shown in FIG. 2, a laser beam focusing optical system **22*a*, the EUV collector mirror 23, the target collector 28, an EUV collector mirror holder 81, and plates 82 and 83 may be provided within the chamber 2**.

The plate 82 may be anchored to the chamber 2. The plate 83 may be anchored to the plate 82. The EUV collector mirror 23 may be anchored to the plate 82 with the EUV collector mirror holder 81.

The laser beam focusing optical system **22*a* may include an off-axis paraboloid mirror 221, a flat mirror 222, and holders 223 and 224. The off-axis paraboloid mirror 221 and the flat mirror 222 may be held by the holders 223 and 224, respectively. The holders 223 and 224 may be anchored to the plate 83**.

The positions and orientations of the off-axis paraboloid mirror 221 and the flat mirror 222 may be held so that the pulse laser beam 33 reflected by those mirrors is focused at the plasma generation region 25. The target collector 28 may be disposed upon a straight line extending from the trajectory 271 of targets 27.

The target supply device 26 may be attached to the chamber 2. The target supply device 26 may include a reservoir 61. The reservoir 61 may hold a target material that has been melted using a heater 261 shown in FIG. 3. An opening serving as a nozzle opening 62 may be formed in the reservoir 61.

Part of the reservoir 61 may be inserted into a through-hole formed in a wall surface of the chamber 2 so that the nozzle opening 62 formed in the reservoir 61 is positioned inside the chamber 2. The target supply device 26 may supply the melted target material to the plasma generation region 25 within the chamber 2 as droplet-shaped targets 27 through the nozzle opening 62. In the present disclosure, the targets 27 may also be referred to as droplets 27.

A timing sensor 450 may be attached to the chamber 2. The timing sensor 450 may include a target sensor 4 and a light-emitting unit 45. The target sensor 4 may include a photodetector 41, a light-receiving optical system 42, and a receptacle 43. The light-emitting unit 45 may include a light source 46, an illumination optical system 47, and a receptacle 48. Light outputted from the light source 46 may be focused by the illumination optical system 47. The focal position of the outputted light may be located substantially upon the trajectory 271 of the targets 27.

The target sensor 4 and the light-emitting unit 45 may be disposed opposite to each other on either side of the trajectory 271 of the targets 27. Windows 21*a* and 21*b* may be provided in the chamber 2. The window 21*a* may be positioned between the light-emitting unit 45 and the trajectory 271 of the targets 27.

The light-emitting unit 45 may focus light at a predetermined position on the trajectory 271 of the targets 27 through the window 21*a*. When a target 27 passes through the focal region of the light emitted from the light-emitting unit 45, the target sensor 4 may detect a change in the light passing through the trajectory 271 of the target 27 and the vicinity thereof. The light-receiving optical system 42 may form, upon a light-receiving surface of the target sensor 4, an image of the trajectory 271 of the target 27 and the vicinity thereof, in order to improve the accuracy of the detection of the target 27.

In the example shown in FIG. 2, the detection region for the target sensor 4 to detect the target 27 may substantially match the focal region 40 of the light emitted from the light-emitting unit 45.

The laser beam direction control unit 34 and the EUV light generation controller 5 may be provided outside the chamber 2. The laser beam direction control unit 34 may include high-reflecting mirrors 341 and 342, as well as holders. The high-reflecting mirrors 341 and 342 may be held by the holders, respectively. The high-reflecting mirrors 341 and 342 may conduct the pulse laser beam outputted by the laser apparatus 3 to the laser beam focusing optical system 22*a* via the window 21.

The EUV light generation controller 5 may receive a control signal from the exposure apparatus 6. The EUV light generation controller 5 may control the target supply device 26 and the laser apparatus 3 in accordance with the control signal from the exposure apparatus 6.

4.2 Operation

Figure 3:
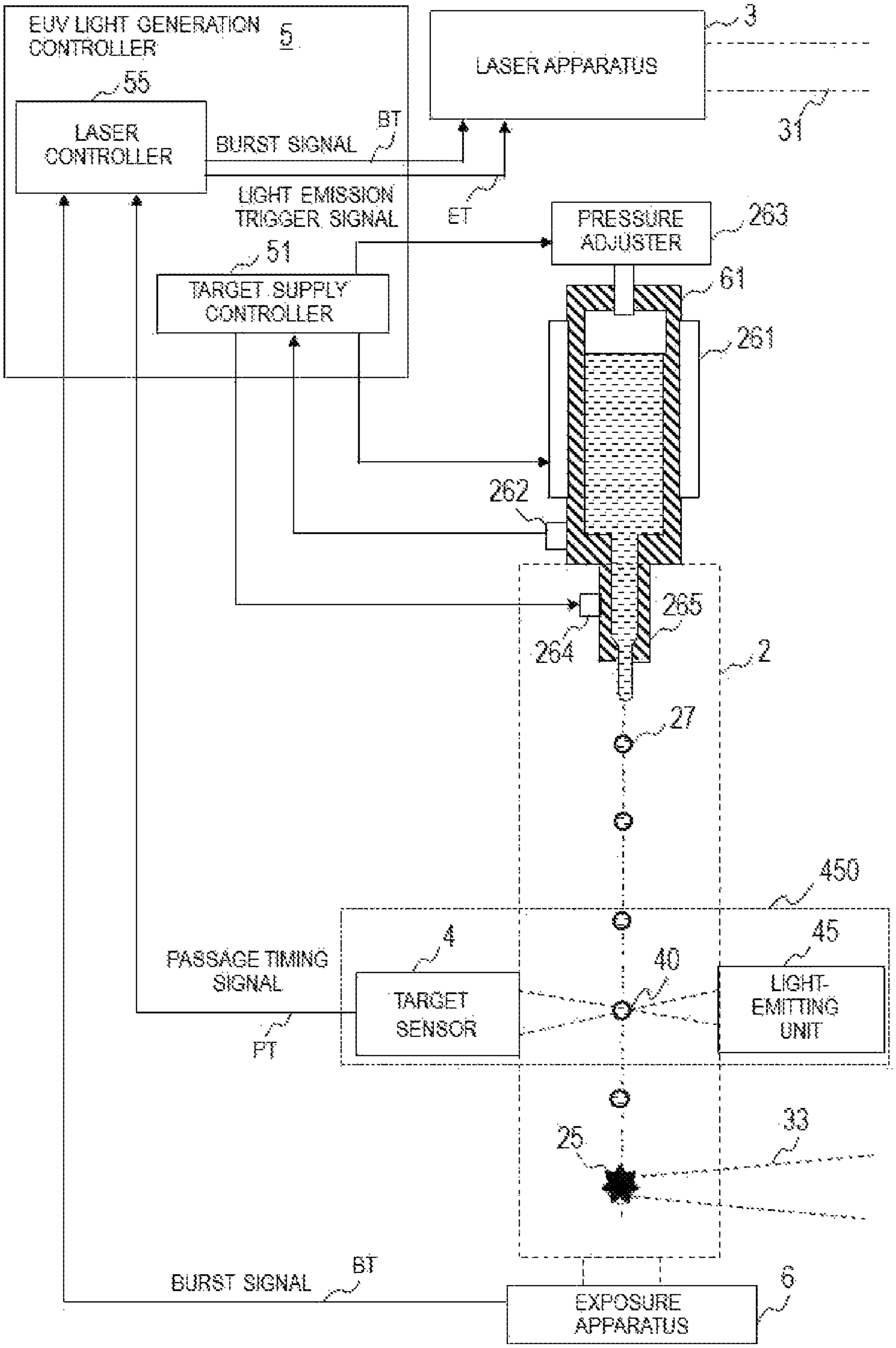
FIG. 3 is a block diagram for illustrating control of a target supply device and a laser apparatus performed by an EUV light generation controller.

FIG. 3 is a block diagram for illustrating control of the target supply device 26 and the laser apparatus 3 performed by the EUV light generation controller 5. The EUV light generation controller 5 may include a target supply controller 51 and a laser controller 55. The target supply controller 51 may control operations performed by the target supply device 26. The laser controller 55 may control operations performed by the laser apparatus 3.

In addition to the reservoir 61 that holds the material of targets 27 in a melted state, the target supply device 26 may include a heater 261, a temperature sensor 262, a pressure adjuster 263, a piezoelectric element 264, and a nozzle 265.

The heater 261 and the temperature sensor 262 may be anchored to the reservoir 61. The piezoelectric element 264 may be anchored to the nozzle 265. The nozzle 265 may have the nozzle opening 62 for outputting targets 27, which are droplets of liquid tin, for example. The pressure adjuster 263 may be provided in a pipe located between a not-shown inert gas supply unit and the reservoir 61 to adjust the pressure of the inert gas supplied from the inert gas supply unit into the reservoir 61.

The target supply controller 51 may control the heater 261 based on a value detected by the temperature sensor 262. For example, the target supply controller 51 may control the heater 261 so that the tin within the reservoir 61 reaches a predetermined temperature higher than or equal to the melting point of the tin. As a result, the reservoir 61 can melt the tin held therewithin. The melting point of tin is 232° C.; the predetermined temperature may be a temperature of 250° C. to 300° C., for example.

The target supply controller 51 may control the pressure within the reservoir 61 using the pressure adjuster 263. The pressure adjuster 263 may adjust the pressure within the reservoir 61 under the control of the target supply controller 51 so that the targets 27 reach the plasma generation region 25 at a predetermined velocity. The target supply controller 51 may send an electrical signal having a predetermined frequency to the piezoelectric element 264. The piezoelectric element 264 may vibrate in response to the received electrical signal, causing the nozzle 265 to vibrate at the stated frequency.

As a result, the droplet-shaped targets 27 may be generated from a jet of the liquid tin outputted from the nozzle opening 62 as a result of the piezoelectric element 264 causing the nozzle opening 62 to vibrate. In this manner, the target supply device 26 may supply the droplet-shaped targets 27 to the plasma generation region 25 at a predetermined velocity and a predetermined interval. For example, the target supply device 26 may generate droplets at a predetermined frequency within a range of several 10 kHz to several 100 kHz.

The timing sensor 450 may detect a target 27 passing through a predetermined region. When a target 27 passes through the focal region of the light produced by the light-emitting unit 45, the target sensor 4 may detect a change in the light passing through the trajectory of the target 27 and the vicinity thereof and output a passage timing signal PT as a detection signal of the target 27. A detection pulse of the passage timing signal PT may be outputted to the laser controller 55 each time a target 27 is detected.

The laser controller 55 may receive a burst signal BT from the exposure apparatus 6 via the EUV light generation controller 5. The burst signal BT may be a signal for instructing the EUV light generation system 11 to generate EUV light within a specified period. The laser controller 55 may perform control to output EUV light to the exposure apparatus 6 during the specified period.

The laser controller 55 may control the laser apparatus 3 to output a pulse laser beam in accordance with the passage timing signal PT in the period where the burst signal BT is ON. The laser controller 55 may control the laser apparatus 3 not to output a pulse laser beam in the period where the burst signal BT is OFF.

For example, the laser controller 55 may output the burst signal BT received from the exposure apparatus 6 and a light emission trigger signal ET delayed by a predetermined time from the passage timing signal PT to the laser apparatus 3. When the burst signal is ON, the laser apparatus 3 may output laser beam pulses in response to light emission trigger pulses of the light emission trigger signal ET.

5. Timing Sensor 5.1 Configuration

Figure 4A:
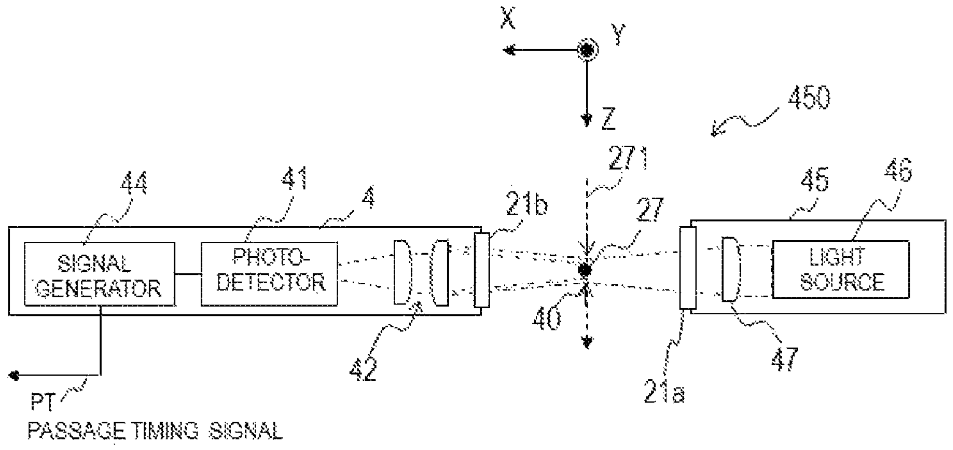
FIG. 4A illustrates a configuration example of a timing sensor in this disclosure.
Figure 4B:
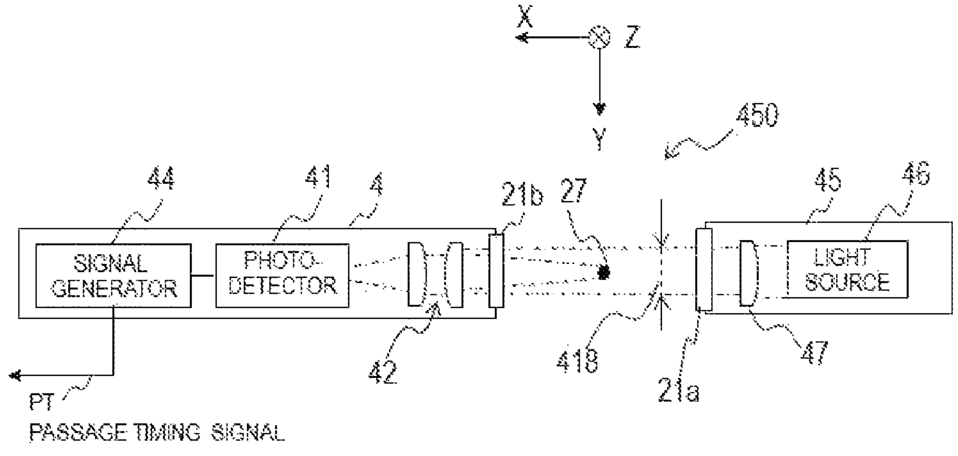
FIG. 4B illustrates a configuration example of a timing sensor in this disclosure.

FIGS. 4A and 4B illustrate a configuration example of the timing sensor 450. In the following description, a direction along the target trajectory 271 is referred to as Z-axis direction, a direction vertical to the Z-axis direction and going from the target trajectory 271 toward the target sensor 4 is referred to as X-axis direction, and a direction vertical to the Z-axis direction and the X-axis direction is referred to as Y-axis direction.

The timing sensor 450 may include a target sensor 4 and a light-emitting unit 45. The target sensor 4 and the light-emitting unit 45 may be disposed opposite to each other across the trajectory 271 of the droplets 27.

The light-emitting unit 45 may include a light source 46 and an illumination optical system 47. Illumination light outputted from the light source 46 may be focused by the illumination optical system 47. The focal region 40 of the illumination light may be located on the droplet trajectory 271.

The illumination optical system 47 may include a cylindrical lens. The cylindrical lens may be disposed so that the central axis of the concave face of the cylindrical lens substantially lies along a Y-axis direction. The illumination optical system 47 may illuminate the droplet trajectory 271 with an elliptical beam having a minor axis of a length close to the diameter of the droplet and a major axis 418 orthogonal to the droplet trajectory 271. A minor-axis direction may correspond to a Z-axis direction and a major-axis direction may correspond to a Y-axis direction. The shape of the beam may be different from an ellipse.

The target sensor 4 may include a photodetector 41, a light-receiving optical system 42, and a signal generator 44. The light-receiving optical system 42 may be a transfer optical system for transferring the image of the droplet trajectory 271 to the light-receiving surface of the photodetector 41.

The photodetector 41 may output a sensor signal in accordance with the amount of received light. The output side of the photodetector 41 may be connected with the input side of the signal generator 44. The signal generator 44 may generate a passage timing signal PT based on the signal from the photodetector 41 and output the signal to the laser controller 55.

5.2 Operation

The illumination light outputted from the light source 46 may be elliptically focused on the droplet trajectory 271 by the cylindrical lens of the illumination optical system 47. The illumination light elliptically focused on the focal region 40 on the droplet trajectory 271 may be transferred by the light-receiving optical system 42 to the photodetector 41.

When a target 27 passes through the focal region 40 of the light from the light-emitting unit 45, the target sensor 4 may detect a change in the light in the focal region 40. Specifically, the photodetector 41 may output a sensor signal in accordance with the amount of received light. The amount of received light of the photodetector 41 may fall when a droplet 27 passes through the focal region 40.

The signal generator 44 may generate a passage timing signal PT based on the sensor signal from the photodetector 41 and output the signal to the laser controller 55. The signal generator 44 may compare the sensor signal with a threshold voltage and, if the amount of received light is smaller than a threshold, output a detection pulse in the passage timing signal.

5.3 Issues in Related Art

Figure 5A:
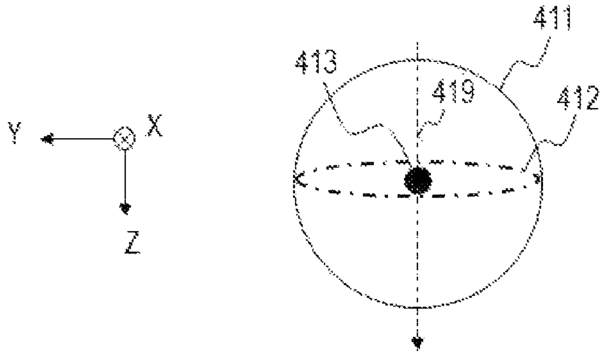
RELATED ART FIG. 5A
FIG. 5A illustrates an image formed on the light-receiving surface of a photodetector in a related art.

FIG. 5A illustrates an image formed on the light-receiving surface 411 of the photodetector in a related art. A shadow 413 of a droplet 27 may exist in an image 412 of elliptical illumination light. When the droplet 27 passes the focal region 40 of the elliptical beam, the shadow 413 of the droplet 27 may pass through the light-receiving surface 411 in a Z-axis direction as shown by an arrow 419. Hence, the amount of light on the light-receiving surface 411 may change.

The detection range for a droplet 27 may be limited by the major axis 418 of the focal region 40 of the elliptical beam on the droplet trajectory 271. The amount of light received on the light-receiving surface 411 may decrease synchronously with the passage of a droplet 27 through the focal region 40.

Figure 5B:
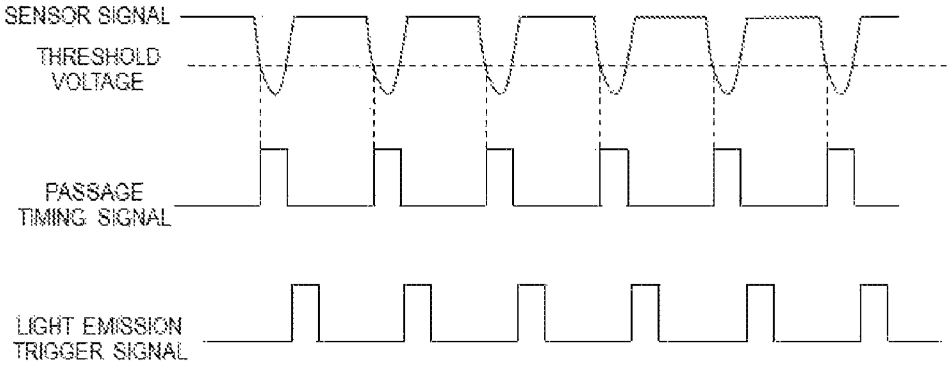
RELATED ART FIG.5B
FIG. 5B is a timing chart of a sensor signal, a threshold voltage, a passage timing signal, and a light emission trigger signal in a related art.

FIG. 5B is a timing chart of a sensor signal, a threshold voltage, a passage timing signal, and a light emission trigger signal in a related art. The target sensor in the related art may generate a detection pulse in the passage timing signal when the sensor signal drops from the reference value to below the threshold voltage. That is to say, the passage timing signal may change to ON. The light emission trigger signal may change synchronously with the passage timing signal.

To extend the life of the EUV collector mirror 23, reducing the debris may be demanded. For this purpose, reducing the diameter of the droplets 27 and providing a timing sensor capable of stably detecting such smaller-diameter droplets 27 may be requested. Furthermore, the timing sensor may be requested to expand the droplet detection range to address the variation in trajectory among the droplets 27.

Figure 6A:
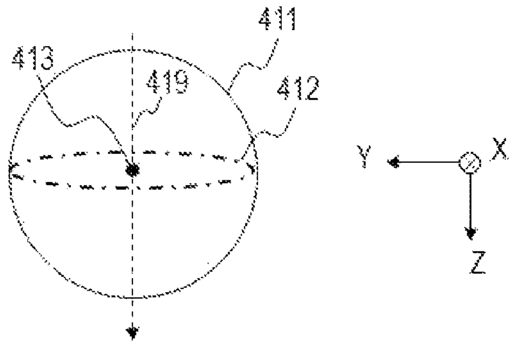
RELATED ART FIG. 6A
FIG. 6A illustrates a transferred image of a small-diameter droplet in a related art.

However, the existing timing sensors may not satisfy the aforementioned requests. In detecting a small-diameter droplet 27 as illustrated in FIG. 6A, the area of the shadow 413 of the droplet 27 in the light-receiving surface 411 may be reduced, so that the change in the amount of received light may become smaller. Accordingly, the amount of drop in the sensor signal from the reference value caused by the shadow 413 of the droplet may decrease.

In another case, if the magnification of the transfer optical system is changed to extend the major axis 418 of the elliptical beam, the droplet 27 may become relatively smaller with respect to the size of the focal region 40, reducing the area of the shadow 413 of the droplet 27 in the light-receiving surface 411. Accordingly, the amount of drop in the sensor signal from the reference value caused by the shadow 413 of the droplet may decrease.

Figure 6B:
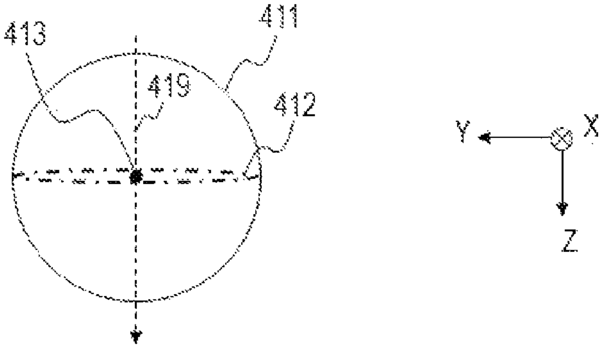
RELATED ART FIG. 6B
FIG. 6B illustrates a transferred image in the case where the magnification of the transfer optical system is changed to extend the major axis of an elliptical beam in a related art.

If, as illustrated in FIGS. 6A and 6B, the sensor signal does not drop below the threshold voltage because of the decrease in the amount of change in the sensor signal caused by the shadow 413, a detection pulse of the passage timing signal may not be generated.

Figure 6C:
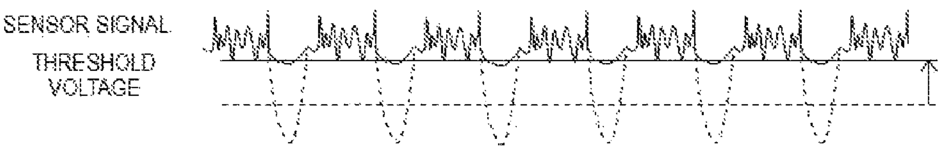
RELATED ART FIG.6C
FIG. 6C illustrates a relationship between the sensor signal and the threshold in FIG. 6A or 6B.

In the meanwhile, noise may enter the sensor signal. Accordingly, if the threshold voltage is set closer to the reference value of the sensor signal as shown in FIG. 6C, the probability of generation of a detection pulse because of the noise may increase.

As described above, in trying to detect a small-diameter droplet with the existing timing sensor or in trying to expand the detection range of the existing timing sensor, the S/N ratio of the sensor signal may get worse; a problem may arise that a droplet cannot be detected properly.

6. Timing Sensor in Embodiment 1

6.1 Configuration

Figure 7A:
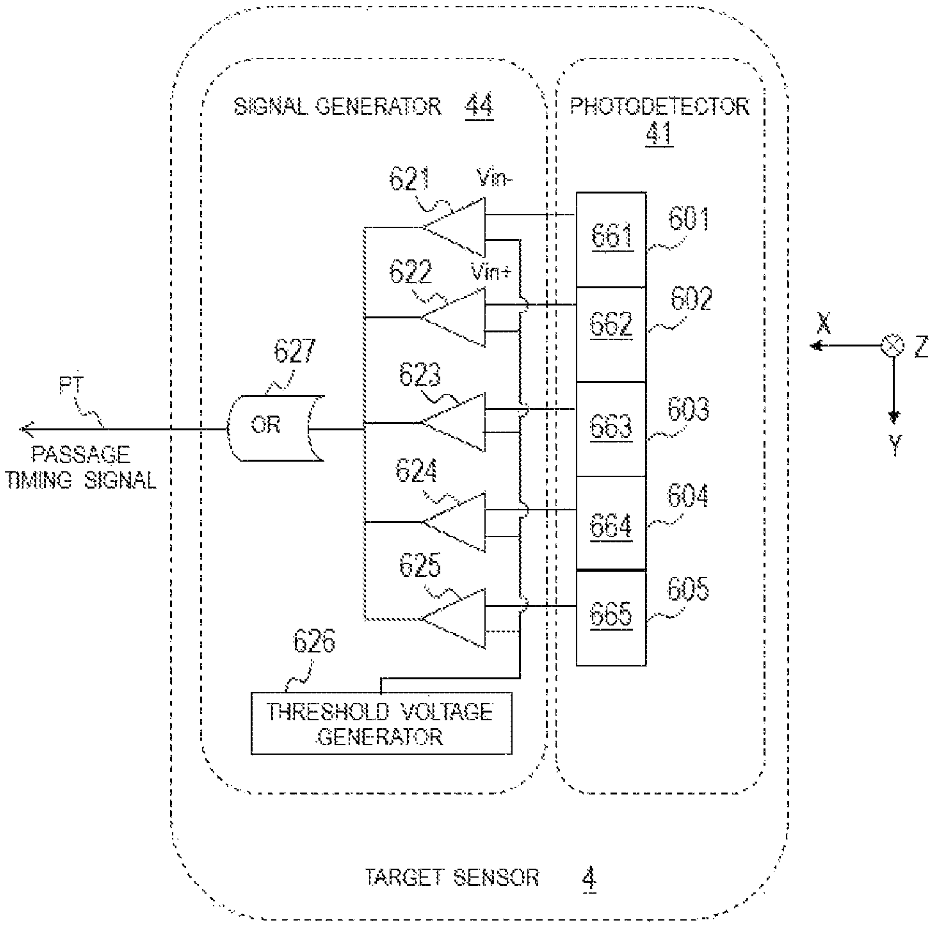
FIG. 7A illustrates a configuration example of a target sensor in Embodiment 1.

FIG. 7A illustrates a configuration example of a target sensor 4 in the present embodiment. The target sensor 4 may include a photodetector 41 and a signal generator 44. The photodetector 41 may include a plurality of sensor elements; each of the plurality of sensor elements has its own light-receiving surface. For example, as illustrated in FIG. 7A, the photodetector 41 may include five sensor elements 661 to 665 and the sensor elements 661 to 665 have light-receiving surfaces 601 to 605, respectively.

The photodetector 41 may be a diode array, an avalanche photodiode array, or a Pin-PD array, for example. One sensor element may include only one diode or a plurality of diodes. Each of the sensor elements 661 to 665 may generate and output a sensor signal in accordance with the amount of light received on its light-receiving surface (one of 601 to 605).

The signal generator 44 may include a plurality of comparators 621 to 625. When input voltage at the Vin− terminal is higher than input voltage at the Vin+ terminal, the output of the comparator (one of 621 to 625) may be at a low level. When input voltage at the Vin+ terminal is higher than input voltage at the Vin− terminal, the output of the comparator (one of 621 to 625) may be at a high level.

The outputs of the sensor elements 661 to 665 may be connected with the comparators 621 to 625 in one-to-one correspondence. The sensor signals outputted by the sensor elements 661 to 665 may be inputted to the comparators 621 to 625. Specifically, the sensor signals of the sensor elements 661 to 665 may be inputted to the Vin− terminals of the comparators 621 to 625.

The signal generator 44 may include a threshold voltage generator 626. The threshold voltage generator 626 may be connected with the Vin+ terminals of the comparators 621 to 625. The threshold voltage generator 626 may output threshold voltage at a predetermined value. The threshold voltage may be preset to the threshold voltage generator 626.

The signal generator 44 may include an OR circuit 627. The input terminal of the OR circuit 627 may be connected with the output terminals of the comparators 621 to 625. The output terminal of the OR circuit 627 may be connected with the laser controller 55.

6.2 Operation

A transferred image of an elliptical beam of illumination light may be formed over all of the plurality of light-receiving surfaces 601 to 605. When a droplet 27 passes through the focal region 40 of the illumination light, a shadow of the droplet 27 may be generated on one of the plurality of light-receiving surfaces 601 to 605.

Figure 7B:
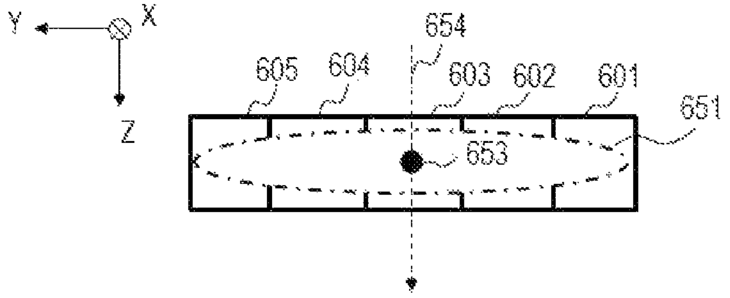
FIG. 7B illustrates an example of an image formed on the light-receiving surface of a photodetector in Embodiment 1.

FIG. 7B illustrates an example of an image formed on the light-receiving surfaces 601 to 605 of the photodetector 41. Within the image 651 of the elliptical illumination light, a shadow 653 of a droplet 27 may exist. In the example of FIG. 7B, when the droplet 27 passes through the focal region 40 of the elliptical beam, the shadow 653 of the droplet 27 may pass through the light-receiving surface 603 in a Z-axis direction as shown by the arrow 654. As a result, the amount of light on the light-receiving surface 603 may change. However, the amounts of light on the other light-receiving surfaces may not change. The direction of movement of the shadow of a droplet on a light-receiving surface may be determined depending on the positional relation between the incident direction of the illumination light onto the light-receiving surface and the droplet trajectory. Accordingly, the direction of movement of the shadow of the droplet on the light-receiving surface may not be the same as the direction of movement of the droplet.

The shapes of the light-receiving surfaces 601 to 605 may be rectangular as shown in FIG. 7B, or different from the rectangular shape. The diameter of the shadow 653 of a droplet 27 may be smaller than the shortest narrow side of the light-receiving surfaces 601 to 605. The shadow 653 of the droplet 27 may be an enlarged image of the droplet 27. The direction of arraying the light-receiving surfaces 601 to 605 may be substantially perpendicular to the direction the shadow 653 of the droplet 27 passes along. The direction of arraying the light-receiving surfaces 601 to 605 may be substantially perpendicular to a direction normal to the light-receiving surfaces 601 to 605. The direction normal to the light-receiving surfaces 601 to 605 may be substantially the same as the incident direction of the light. These may be applicable to the other embodiments.

Figure 7C:
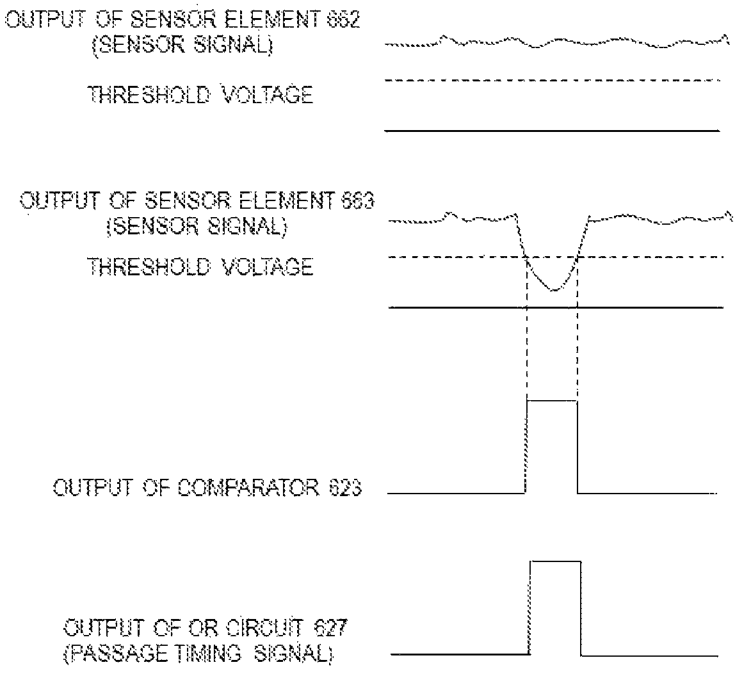
FIG. 7C illustrates variations in a plurality of signals corresponding to the image in FIG. 7B.

FIG. 7C illustrates variations in a plurality of signals corresponding to the image in FIG. 7B. Specifically, FIG. 7C shows the variations in the outputs of the sensor element 662, the sensor element 663, the comparator 623, and the OR circuit 627.

The sensor element 663 having the light-receiving surface 603 may generate a signal corresponding to the change in the amount of light caused by the shadow 653 of the droplet 27. The output of the sensor element 662 having the light-receiving surface 602 may be within the noise level. The shadow 653 of the droplet 27 may not be generated on the light-receiving surface 602 and the output of the sensor element 662 may be within the noise level. On the other light-receiving surfaces 601, 604, and 605, the shadow 653 of the droplet may not be generated and the outputs of the sensor elements 661, 664, and 665 may be within the noise level.

The comparator 623 may receive the output of the sensor element 663 having the light-receiving surface 603. The comparator 623 may compare the output of the sensor element 663 with the threshold voltage received from the threshold voltage generator 626. When the input voltage at the Vin+ terminal is higher than the input voltage at the Vin− terminal, the output of the comparator 623 may be at a high level. That is to say, when the threshold voltage is higher than the output of the sensor element 663, the output of the comparator 623 may be at a high level. Meanwhile, the outputs of the other comparators may be at a low level.

The threshold voltage generated by the threshold voltage generator 626 may be determined in advance, for example by experiment, so that each of the sensor elements 661 to 665 can detect a drop of the amount of light caused by a shadow 653 of a droplet 27 but will not detect a noise.

The OR circuit 627 may output a high-level signal when one of the outputs of the comparators 621 to 625 is at a high level. In the example of FIG. 7C, when the output of the comparator 623 is at a high level, the output of the OR circuit 627 may be at a high level. The output signal from the OR circuit 627 may be the passage timing signal PT. The passage timing signal PT at a high level may be a detection pulse indicating detection of a target 27.

The passage timing signal PT from the OR circuit 627 may be inputted to the laser controller 55. The laser controller 55 may generate a light emission trigger signal ET synchronized with the passage timing signal PT. The laser controller 55 may generate a light emission trigger pulse delayed from a detection pulse of the passage timing signal PT by a predetermined time.

6.3 Effects

As described above, the target sensor 4 may receive a transferred image of illumination light on the plurality of light-receiving surfaces 601 to 605 and output sensor signals in accordance with the individual amounts of light received on the light received faces 601 to 605. This configuration may improve the ratio of the region of the shadow of a droplet to the region receiving the illumination light. As a result, the target sensor 4 may detect a droplet 27 with a high S/N ratio.

The target sensor 4 may process the sensor signals from the light-receiving surfaces 601 to 605 with a high-speed logical circuit like the comparators 621 to 625 and the OR circuit 627 to generate a detection pulse representing a timing of detection of a droplet 27 in the passage timing signal PT even if the droplet is detected on any one of the light-receiving surfaces.

Accordingly, the timing sensor 450 in the present embodiment may detect a small-diameter droplet 27. The timing sensor 450 in the present embodiment may also expand the detection range for a droplet 27.

7. Timing Sensor in Embodiment 2 (Slit)

7.1 Issues

Figure 8A:
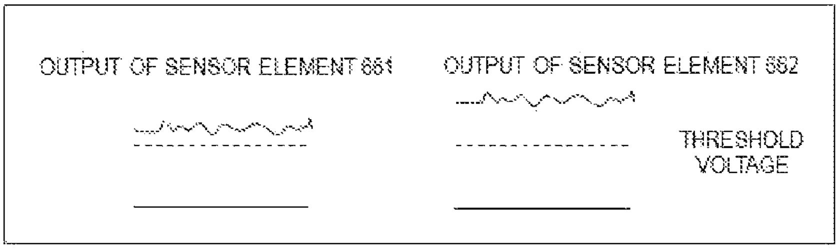
FIG. 8A illustrates outputs of sensor elements corresponding to the transferred image in FIG. 7B.

FIG. 8A illustrates sensor signals outputted from the sensor elements 661 and 662 corresponding to the transferred image of the illumination light in FIG. 7B. In the transferred image of the elliptical beam on the light-receiving surfaces 601 to 605 shown in FIG. 7B, the amount of light received on the light-receiving surface 601 may be smaller than the amount of light received on the light-receiving surface 602. Accordingly, the output level of the sensor element 661 having the light-receiving surface 601 may be lower than the output level of the sensor element 662 having the light-receiving surface 602 as shown in FIG. 8A.

As a result, the noise level of the sensor signal from the sensor element 661 may be lower than the noise level of the sensor signal from the sensor element 662. Accordingly, the noise level of the sensor element 661 that receives a smaller amount of light may get close to the threshold voltage, so that the possibility for the comparator 621 to erroneously detect the noise as a shadow of a droplet 27 may increase.

7.2 Configuration

Figure 8B:
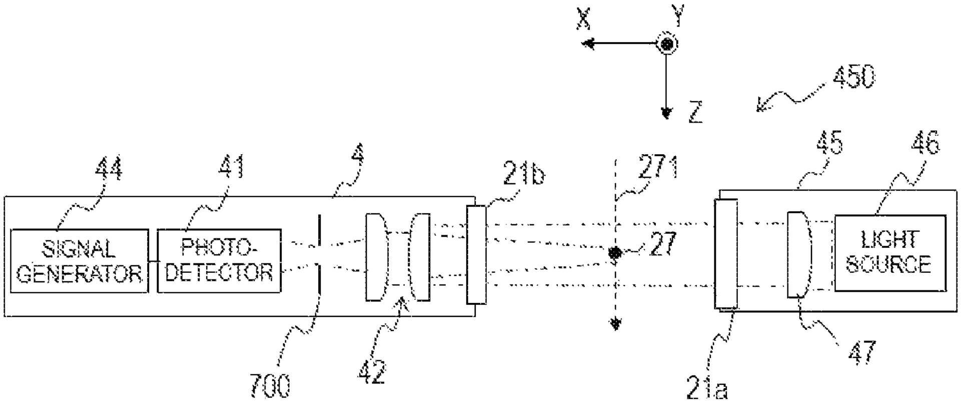
FIG. 8B illustrates a configuration of a timing sensor in Embodiment 2.
Figure 8C:
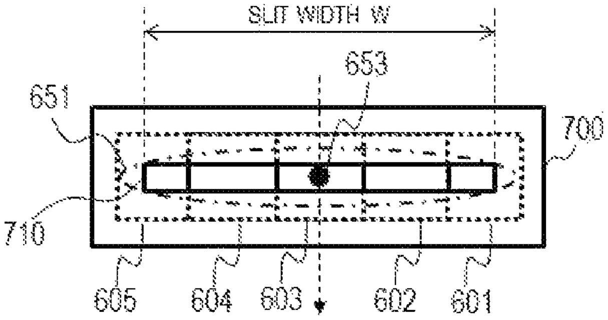
FIG. 8C illustrates an example of an image formed on the light-receiving surfaces in Embodiment 2.

FIGS. 8B and 8C illustrate a configuration of a target sensor 4 in the present embodiment. The target sensor 4 may include a slit plate 700. FIG. 8B illustrates the configuration of the target sensor 4 as seen in a Y-axis direction. FIG. 8C illustrates the relation of the slit plate 700 and the light-receiving surfaces 601 to 605 of the photodetector 41. The slit plate 700 may be placed so that the differences in the amount of received light will be small among the light-receiving surfaces 601 to 605.

As shown in FIG. 8B, the slit plate 700 may be provided between the photodetector 41 and the light-receiving optical system 42. The slit plate 700 may be disposed so that a slit opening 710 will be positioned within the elliptical beam illuminating the slit plate 700. For example, the slit plate 700 may be disposed in the vicinity of the light-receiving surfaces 601 to 605 of the photodetector 41. The slit plate 700 may be disposed at the position to which the light-receiving optical system 42 transfers the image as illustrated in FIG. 8C. Only the illumination light that passes through the slit opening 710 may be received on the light-receiving surfaces 601 to 605.

The detection range of the photodetector 41 may be limited by the slit width W of the slit opening 710. If the S/N ratio of the photodetector 41 is good enough, the illumination light may not need to be shaped to an elliptical beam by the illumination optical system 47 in the light-emitting unit 45. For example, the light-emitting unit 45 may employ a collimating optical system.

7.3 Effects

The slit plate 700 in the present embodiment may equalize the amounts of light received by the light-receiving surfaces 601 to 605 to reduce the erroneous detection of a droplet by the photodetector 41.

8. Timing Sensor in Embodiment 3 (Multiple Thresholds)

8.1 Configuration and Operation

Figure 9A:
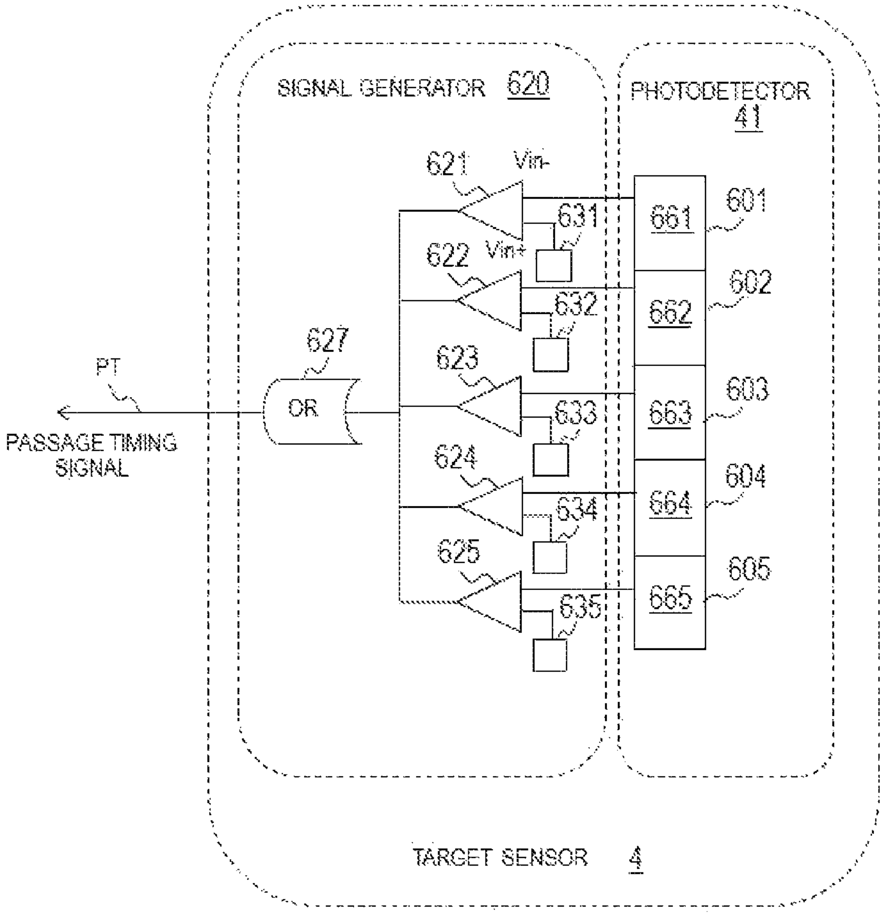
FIG. 9A illustrates a configuration of a target sensor in Embodiment 3.

FIG. 9A illustrates a configuration of a target sensor 4 in the present embodiment. The target sensor 4 in the present embodiment may be able to solve the issue described with reference to FIG. 8A. The target sensor 4 may include threshold voltage generators 631 to 635 for the comparators 621 to 625, respectively. The output terminals of the threshold voltage generators 631 to 635 may be connected with the Vin+ terminals of the comparators 621 to 625.

The threshold voltage generators 631 to 635 may supply threshold voltages determined in accordance with the illumination light profiles on the light-receiving surfaces 601 to 605. That is to say, the threshold voltage generators 631 to 635 may supply threshold voltages determined in accordance with the amounts of light received on the light-receiving surfaces 601 to 605 when a shadow of a droplet 27 does not exist. In each of the threshold voltage generators 631 to 635, the threshold voltage for the threshold voltage generator to supply may be preset.

The threshold voltages supplied by the threshold voltage generators 631 to 635 may be individually different. Some of the threshold voltages supplied by the threshold voltage generators 631 to 635 may be the same. In the case of supplying threshold voltages at the same value to different comparators, those comparators may be connected with a threshold voltage generator common thereto. The threshold voltage generators 631 to 635 may constitute one threshold voltage generation unit.

Figure 9B:
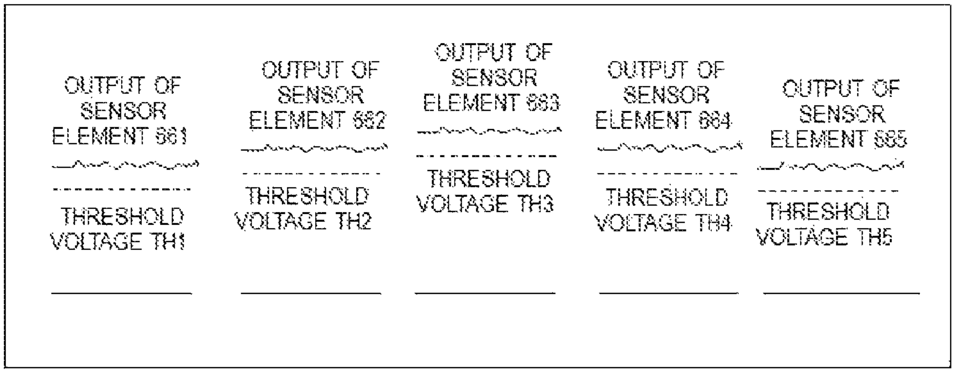
FIG. 9B illustrates an example of individual threshold voltages supplied by threshold voltage generators in Embodiment 3.

FIG. 9B illustrates an example of individual threshold voltages supplied by the threshold voltage generators 631 to 635. FIG. 9B corresponds to the state where the image 651 in FIG. 7B is received. The output level of the sensor element 663 may be the highest; the output levels of the sensor elements 661 and 665 may be the lowest; and the output levels of the sensor elements 662 and 664 may be intermediate therebetween.

The threshold voltage generators 631 to 635 may supply threshold voltages TH1 to TH5, respectively. The threshold voltage TH3 may be the highest; the threshold voltages TH1 and TH5 may be the lowest; and the threshold voltages TH2 and TH4 may be intermediate therebetween. As noted from this, the relation of the output levels among the threshold voltages TH1 to TH5 may be the same as the relation of the levels of the sensor signals from the sensor elements 661 to 665. The threshold voltages TH1 to TH5 may reflect the individual differences in sensitivity of the light-receiving surfaces 601 to 605.

8.2 Effects

The target sensor 4 in the present embodiment may reduce the erroneous detection of a droplet by the photodetector 41 with the thresholds in accordance with the amounts of light received by the light-receiving surfaces 601 to 605.

9. Timing Sensor in Embodiment 4 (Multi-Row Light-Receiving Surfaces)

9.1 Arrangement of Light-Receiving Surfaces

9.1.1 Configuration

Figure 10A:
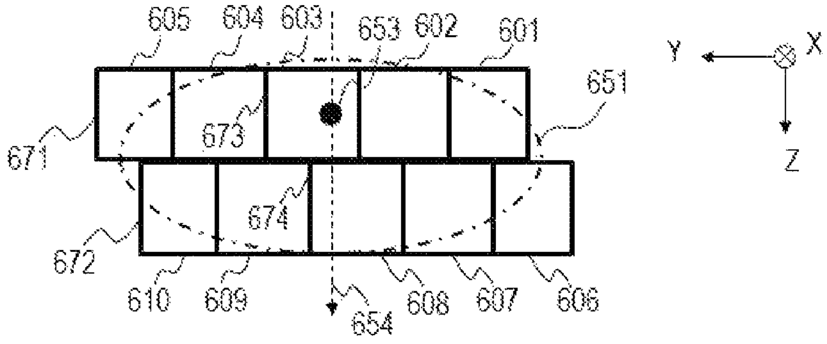
FIG. 10A illustrates an example of arrangement of light-receiving surfaces in a photodetector in Embodiment 4.
Figure 10B:
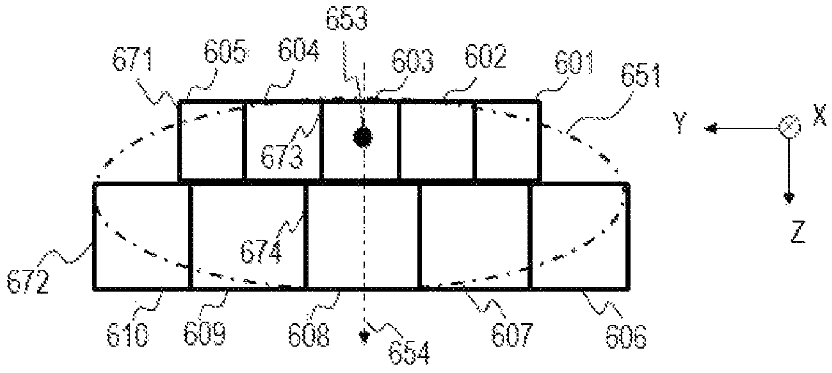
FIG. 10B illustrates an example of arrangement of light-receiving surfaces in a photodetector in Embodiment 4.
Figure 10C:
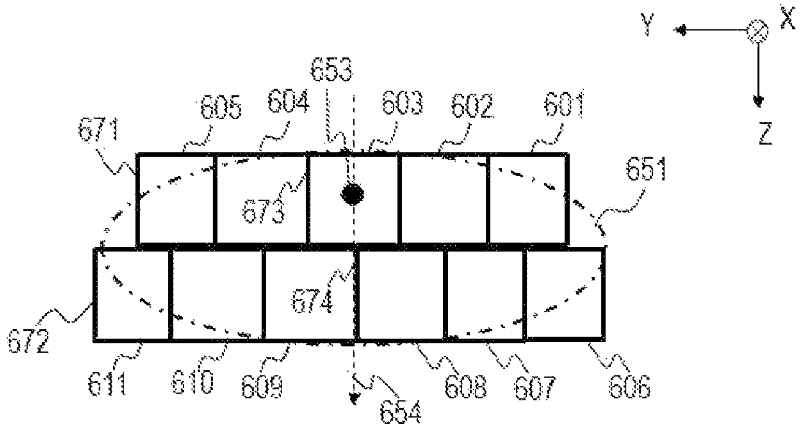
FIG. 10C illustrates an example of arrangement of light-receiving surfaces in a photodetector in Embodiment 4.

FIGS. 10A to 10C illustrate examples of arrangement of light-receiving surfaces in the photodetector 41 in the present embodiment. As illustrated in FIG. 10A, the photodetector 41 may include light-receiving surfaces 601 to 610. Each of the light-receiving surfaces 601 to 610 may be the light-receiving surface of a sensor element. Sensor signals individually corresponding to the light-receiving surfaces 601 to 610 may be outputted.

The light-receiving surfaces 601 to 605 may be joined and arrayed in a direction of the major axis of the elliptical beam. The light-receiving surfaces 606 to 610 may be joined and arrayed in a direction of the major axis of the elliptical beam. The direction of the major axis of the elliptical beam may be a Y-axis direction. The light-receiving surfaces 601 to 605 may be the light-receiving surface of one sensor element array 671. The light-receiving surfaces 606 to 610 may be the light-receiving surface of one sensor element array 672.

The group of the light-receiving surfaces 601 to 605 and the group of the light-receiving surfaces 606 to 610 may be adjoined and arranged in a direction of the minor axis of the elliptical beam. The direction of the minor axis of the elliptical beam may be a Z-axis direction. That is to say, the photodetector 41 may have two rows of light-receiving surfaces in the Z-axis direction.

The light-receiving surfaces 601 to 610 may have the identical shapes. The central points of the light-receiving surfaces 601 to 605 may be aligned in a Y-axis direction. The central points of the light-receiving surfaces 606 to 610 may be aligned in a Y-axis direction. The central points of the light-receiving surfaces 601 to 610 may be located at different positions when viewed in a Z-axis direction.

That is to say, the joining parts of the light-receiving surfaces 601 to 605 may be located at different positions from the joining parts of the light-receiving surfaces 606 to 610 when viewed in a Z-axis direction. In other words, the joining parts of the light-receiving surfaces 601 to 605 and the joining parts of the light-receiving surfaces 606 to 610 may be disposed at different positions in a Y-axis direction. A joining part may be the part combining two adjoining light-receiving surfaces. In FIG. 10A, the joining part of the light-receiving surfaces 603 and 604 is denoted by a reference numeral 673 and the joining part of the light-receiving surfaces 608 and 609 is denoted by a reference numeral 674 by way of example.

As illustrated in FIG. 10B, the photodetector 41 may include different sizes of light-receiving surfaces. In FIG. 10B, the light-receiving surfaces 601 to 605 may have the identical shapes. The light-receiving surfaces 606 to 610 may have the identical shapes. The sizes of the light-receiving surfaces 606 to 610 may be larger than the sizes of the light-receiving surfaces 601 to 605. The central positions of the sensor element arrays 671 and 672 may be aligned in the same Z-axis direction. The joining parts of the light-receiving surfaces 601 to 605 may be located at different positions from the joining parts of the light-receiving surfaces 606 to 610 when viewed in a Z-axis direction.

As illustrated in FIG. 10C, the number of light-receiving surfaces on the first row in a Z-axis direction may be different from the number of light-receiving surfaces on the second row. For example, the sensor element array 671 may have five light-receiving surfaces 601 to 605 and the second sensor element array 672 may have six light-receiving surfaces 606 to 611. The joining parts of the light-receiving surfaces 601 to 605 may be located at different positions from the joining parts of the light-receiving surfaces 606 to 611 when viewed in a Z-axis direction.

The number of rows of light-receiving surfaces in a Z-axis direction may be three or more. The joining parts of the light-receiving surfaces on all of the rows may be located at different positions when viewed in a Z-axis direction.

9.1.2 Effects

The multi-row light-receiving surfaces of the photodetector 41 in the present embodiment may reduce the failures in detection of a droplet 27 caused by the shadow 653 of a droplet 27 overlapped with a joining part of light-receiving surfaces because if the shadow 653 of a droplet 27 passes on a joining part of light-receiving surfaces on either row, the shadow 653 will pass through a light-receiving surface on the other row.

9.2 Timing Control

9.2.1 Configuration

Figure 11:
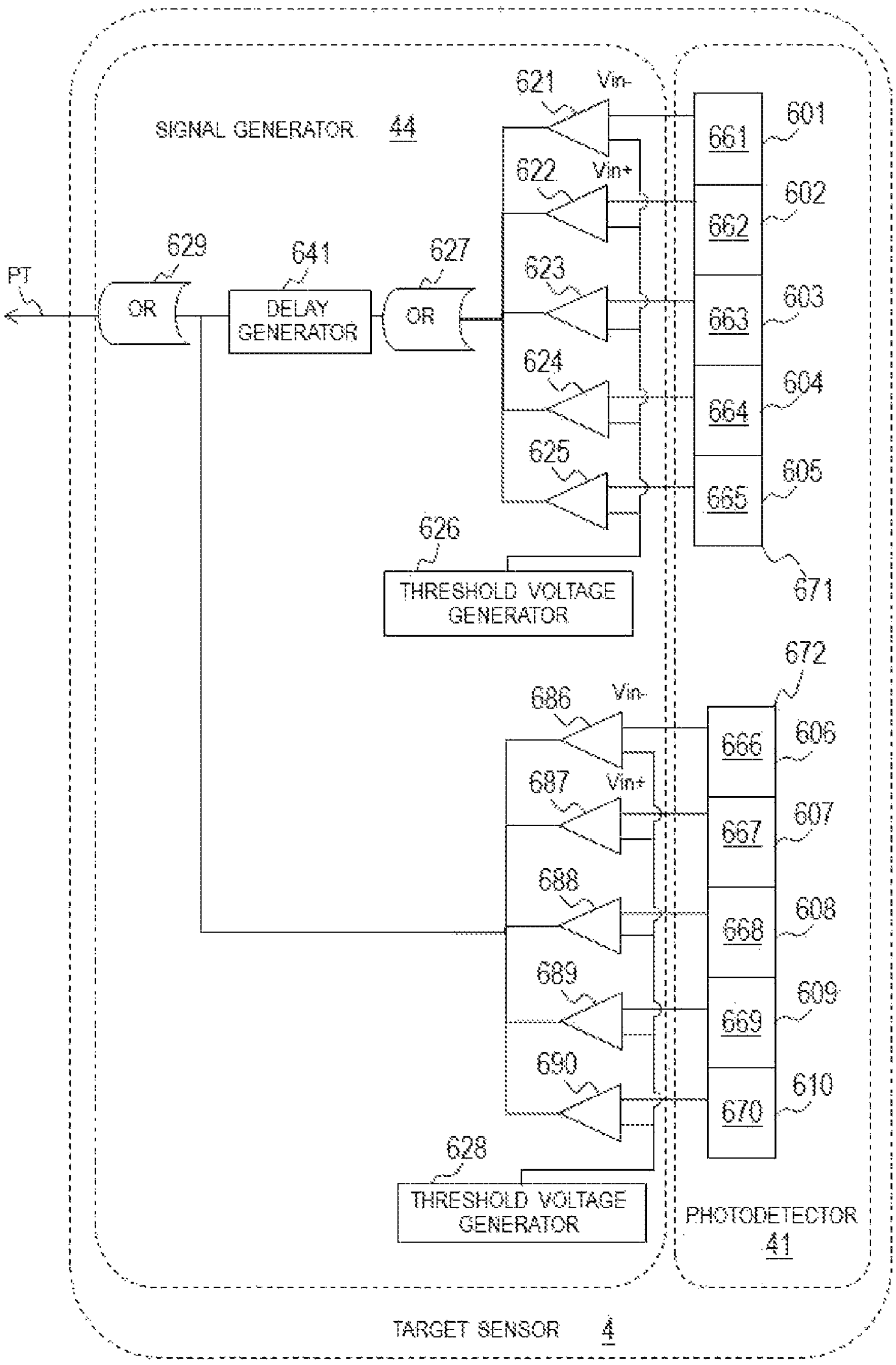
FIG. 11 illustrates a configuration example of a target sensor in Embodiment 4.

FIG. 11 illustrates a configuration example of a target sensor 4 having the configuration shown in FIG. 10A or 10B. Hereinafter, differences from the configuration in FIG. 7A will be mainly described. The photodetector 41 may include sensor elements 666 to 670 respectively having the light-receiving surfaces 606 to 610.

The signal generator 44 may include comparators 686 to 690. The Vin− terminals of the comparators 686 to 690 may receive sensor signals of the sensor elements 666 to 670, respectively. The Vin+ terminals of the comparators 686 to 690 may receive a threshold voltage from a threshold voltage generator 628.

The signal generator 44 may include a delay generator 641. The output of an OR circuit 627 may be connected with the delay generator 641. The delay generator 641 may be connected with either the outputs of the comparators 621 to 625 or the outputs of the sensor elements 661 to 665. The signal generator 44 may include another OR circuit 629. The input of the OR circuit 629 may be connected with the delay generator 641 and the output of the comparators 686 to 690.

As illustrated in FIGS. 10A and 10B, the sensor element array 671 may be disposed upstream of the sensor element array 672 on the trajectory of the shadow 653 of a droplet 27. The sensor element array 671 may detect the shadow 653 of the droplet 27 earlier than the sensor element array 672.

The delay generator 641 may add a predetermined delay time to the output of the OR circuit 627 of the sensor element array 671 to reduce the difference in time of detection of a droplet 27 between the sensor element array 671 and the sensor element array 672.

The delay time set to the delay generator 641 may be determined and preset based on the distance between the sensor element array 671 and the sensor element array 672 and the speed of targets 27. The delay time set to the delay generator 641 may be variable using another component in the signal generator 44.

9.2.2 Operation

When some sensor element of the sensor element array 671 detects a droplet 27, the OR circuit 627 may output a high-level pulse. The output of the OR circuit 627 may be inputted to the delay generator 641. The delay generator 641 may delay the received pulse by a specified delay time to output. The pulse from the delay generator 641 may be inputted to the OR circuit 629.

When some sensor element of the sensor element array 672 detects a droplet 27, the comparator associated with the sensor element that has detected the droplet 27 may output a high-level pulse. The pulse outputted from the comparator may be inputted to the OR circuit 629. If both of the sensor element array 671 and 672 detect a droplet 27, pulses may be inputted to the OR circuit 629 at substantially the same timing because of the operation of the delay generator 641.

The OR circuit 629 may output a passage timing signal. When at least either the sensor element array 671 or 672 detects a droplet 27, the OR circuit 629 may generate a detection pulse indicating detection of a droplet 27 in the passage timing signal.

9.2.3. Effects

The timing control in the present embodiment may reduce the difference in timing of detection of a droplet on the multi-row light-receiving surfaces and generate a detection pulse in the passage timing signal at a right timing.

10. Timing Sensor in Embodiment 5 (Split in Z-Axis Direction)

10.1 Configuration and Operation

Figure 12A:
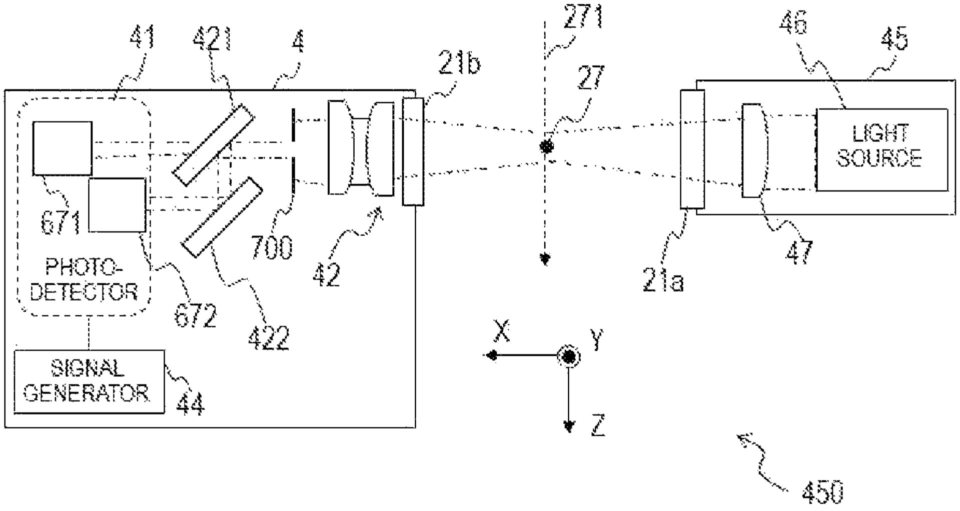
FIG. 12A illustrates a configuration of a timing sensor in Embodiment 5.

FIG. 12A illustrates a configuration of a timing sensor 450 in the present embodiment. The timing sensor 450 in the present embodiment may split the illumination light and form an image on the light-receiving surface of each sensor element array of multi-row sensor element arrays that are disposed at different positions in the direction of movement of the shadow of a droplet.

For example, the target sensor 4 may include a beam splitter 421 and a mirror 422. The reflectance of the beam splitter may be 50%, for example. The photodetector 41 may include two rows of sensor element arrays 671 and 672 in a Z-axis direction. As described with reference to FIGS. 10A to 10C, the joining parts of the light-receiving surfaces of the sensor element arrays 671 and 672 may be disposed not to be overlapped when viewed in a Z-axis direction.

To make the beams split at the beam splitter 421 have the same length of optical paths, the light-receiving surfaces of the sensor element arrays 671 and 672 in two rows may be placed at different positions in an X-axis direction. That is to say, the optical path length from the beam splitter 421 to the light-receiving surface of the sensor element array 671 may be substantially the same as the optical path length from the beam splitter 421 to the light-receiving surface of the sensor element array 672 via the mirror 422.

The illumination light from the light-emitting unit 45 may travel through the light-receiving optical system 42 and a slit plate 700, be split by the beam splitter 421, and be imaged on each of the light-receiving surfaces of the sensor element arrays 671 and 672.

Figure 12B:
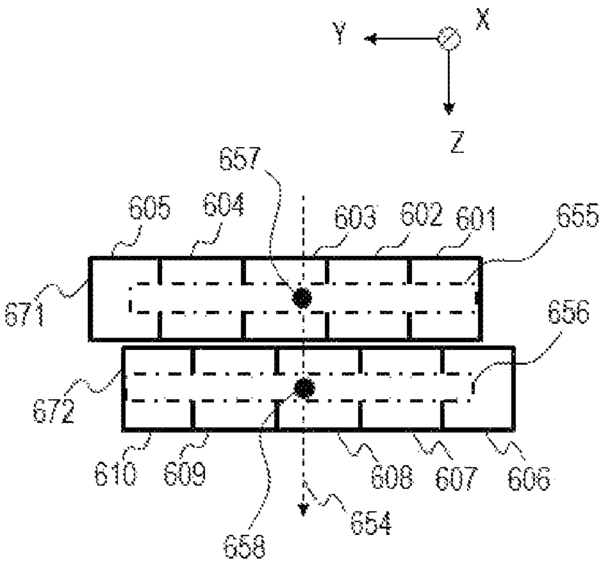
FIG. 12B illustrates images on the light-receiving surfaces of sensor element arrays in Embodiment 5.

FIG. 12B illustrates images on the light-receiving surfaces of the sensor element arrays 671 and 672. An image 655 of the illumination light may be formed on the light-receiving surfaces 601 to 605 of the sensor element array 671. An image 656 of the illumination light may be formed on the light-receiving surfaces 606 to 610 of the sensor element array 672.

A shadow 657 of a droplet 27 may exist on the light-receiving surface 603 of the sensor element array 671. A shadow 658 of the droplet 27 may exist on the light-receiving surface 608 of the sensor element array 672. Both of the sensor element arrays 671 and 672 may output a detection pulse of the droplet 27 at substantially the same time.

10.2 Effects

The present embodiment may reduce the time lag in detection of a droplet on the multi-row light-receiving surfaces to generate a detection pulse in the passage timing signal at a right timing without using a timing control circuit.

11. Timing Sensor in Embodiment 6 (Split in Y-Axis Direction)

11.1 Configuration and Operation

Figure 13A:
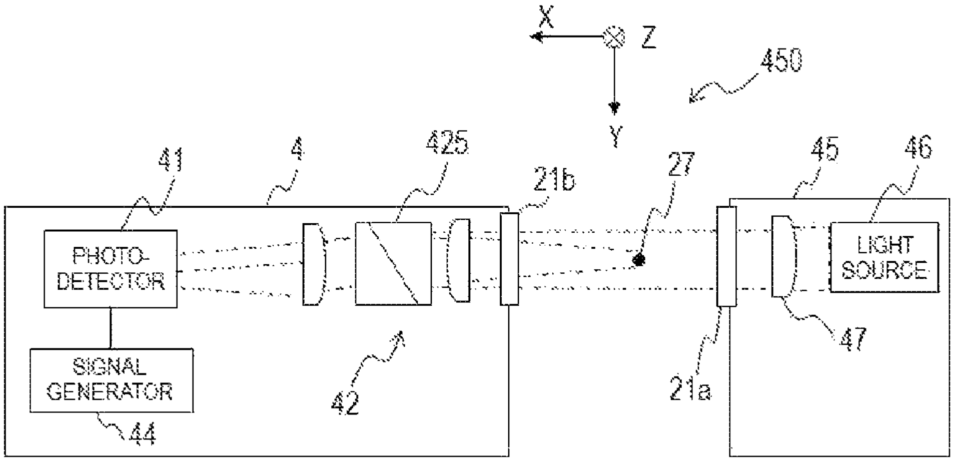
FIG. 13A illustrates a configuration of a timing sensor in Embodiment 6.

FIG. 13A illustrates a configuration of a timing sensor 450 in the present embodiment. The timing sensor 450 in the present embodiment may split the illumination light and form two images on a plurality of light-receiving surfaces at different positions in the direction along which the plurality of light-receiving surfaces are arrayed.

For example, the target sensor 4 may include a Rochon prism 425 in the light-receiving optical system 42 as an optical element for splitting an optical path. The illumination light outputted by the light-emitting unit 45 may be non-polarized light or circularly-polarized light. The photodetector 41 may include a diode array shown in FIGS. 7A and 7B.

The illumination light may be split by the Rochon prism 425 into two illumination beams in accordance with the polarization direction. Two transferred images of the split illumination beams may be formed on the light-receiving surfaces of the diode array.

Figure 13B:
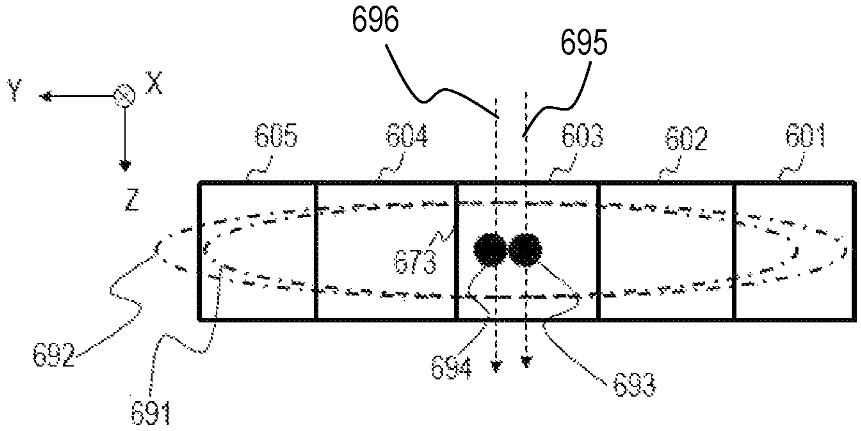
FIG. 13B illustrates an image on the light-receiving surface of a sensor element array in Embodiment 6.

FIG. 13B illustrates the images on the light-receiving surfaces 601 to 605 of the diode array. Images 691 and 692 of the illumination beams may be formed on the light-receiving surfaces 601 to 605. Shadows 693 and 694 of a droplet 27 may exist on the light-receiving surface 603. The shadow 693 may be included in the image 691 of one illumination beam and the shadow 694 may be included in the image 692 of the other illumination beam.

Two droplet shadows 693 and 694 may be formed side by side in the direction along which the light-receiving surfaces 601 to 605 are arrayed and at least one of the droplet shadows may be formed off the joining parts of light-receiving surfaces. In the example of FIG. 13B, the comparator 623 may output a high-level pulse in response to the sensor signal from the sensor element 663.

11.2 Effects

In the present embodiment, on a plurality of light-receiving surfaces that are arrayed in a direction vertical to the direction of movement of a droplet shadow, two droplet shadows may be formed side by side in the direction along which the light-receiving surfaces are arrayed. Accordingly, at least one of the droplet shadows may be off the joining parts of light-receiving surfaces for a droplet to be detected without failure.

12. Timing Sensor in Embodiment 7 (Detection of Reflection)

Figure 14A:
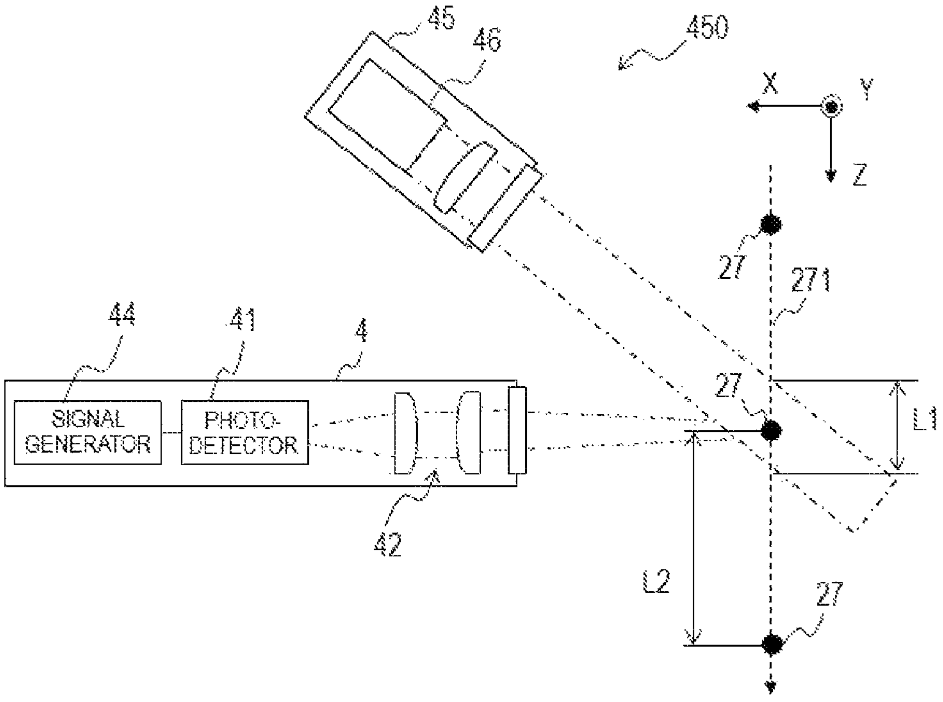
FIG. 14A illustrates a configuration of a timing sensor in Embodiment 7.

FIG. 14A illustrates a configuration of a timing sensor 450 in the present embodiment. The timing sensor 450 in the present embodiment may detect an image of reflection off a droplet. The length L1 of the illumination light in the direction of the trajectory of the droplets 27 may be shorter than an interval L2 between droplets 27. This configuration may allow only one droplet 27 to be included in the illumination light from the light-emitting unit 45 and prevent a plurality of droplets 27 from being included.

The target sensor 4 may receive the illumination light outputted from the light-emitting unit 45 and reflected by a droplet 27 at the photodetector 41. The configuration of the target sensor 4 may be substantially the same as the configuration illustrated in FIGS. 7A and 7B. However, the sensor signals of the sensor elements 661 to 665 may be inputted to the Vin+ terminals of the comparators 621 to 625, respectively. The threshold voltage generator 626 may be connected with the Vin− terminals of the comparators 621 to 625. The threshold voltage from the threshold voltage generator 626 may be set to a value suitable to detect the reflection.

Figure 14B:
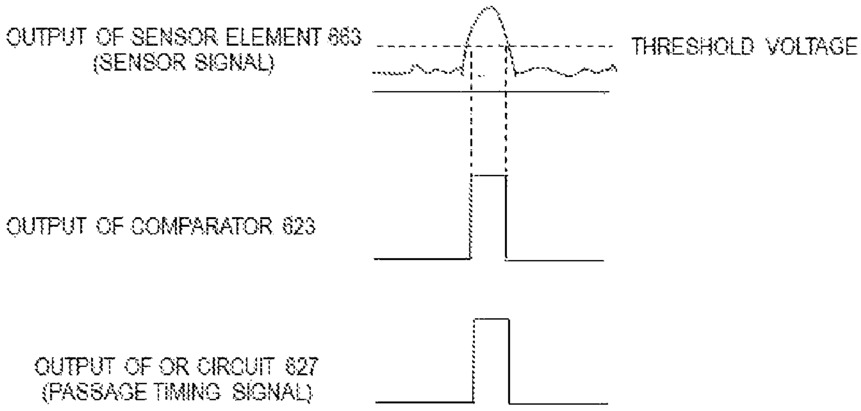
FIG. 14B illustrates variations in some signals in the target sensor in Embodiment 7.

FIG. 14B illustrates variations in some signals in the target sensor 4. Specifically, FIG. 14B shows variations in the outputs of the sensor element 663, the comparator 623, and the OR circuit 627 by way of example. The reflection off a droplet 27 may pass through the light-receiving surface 603. Now, differences from FIG. 7C will be mainly described hereinbelow.

The sensor element 663 having the light-receiving surface 603 may generate a signal corresponding to the change in the amount of light caused by the reflection off a droplet 27. The amount of light received on the light-receiving surface 603 may increase synchronously with passage of the droplet. The threshold voltage may be a predetermined value higher than the noise level of the output of the sensor element 663. The comparator 623 may output a detection pulse of the droplet 27 when the sensor signal outputted by the sensor element 663 exceeds the threshold voltage.

A slit plate may be further provided to limit the light incident onto the photodetector 41 so that the photodetector 41 will detect only one droplet 27. This configuration may allow the L1 longer than the L2. The timing sensor in the present embodiment for detecting reflection off a droplet 27 may employ the above-described configurations of the timing sensor that detects the shadow of a droplet.

13. Timing Sensor in Embodiment 8

13.1 Configuration of Timing Sensor

Figure 15:
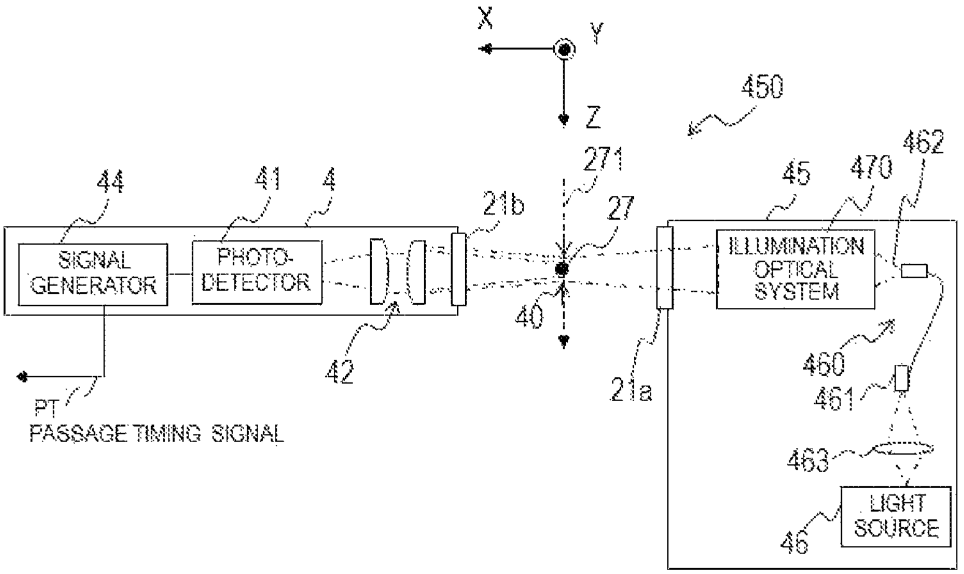
FIG. 15 illustrates a configuration of a timing sensor in Embodiment 8.

FIG. 15 illustrates a configuration of a timing sensor 450 in the present embodiment. The light-emitting unit 45 may include an optical fiber 460 between the light source 46 and the illumination optical system 470. The optical fiber 460 may be made of a material that transmits the wavelength of the light outputted by the light source 46. The fiber-input optical system 463 may be disposed between the light source 46 and the input end 461 of the optical fiber 460.

The fiber-input optical system 463 may transform the light outputted by the light source 46 to be incident on the optical fiber 460 within the NA of the core of the optical fiber 460. The light source 46 may be a CW (continuous wave) laser, for example. An illumination optical system 470 may be provided between the output end 462 of the optical fiber 460 and a window 21*a*.

13.2 Configuration of Illumination Optical System

Figure 16A:
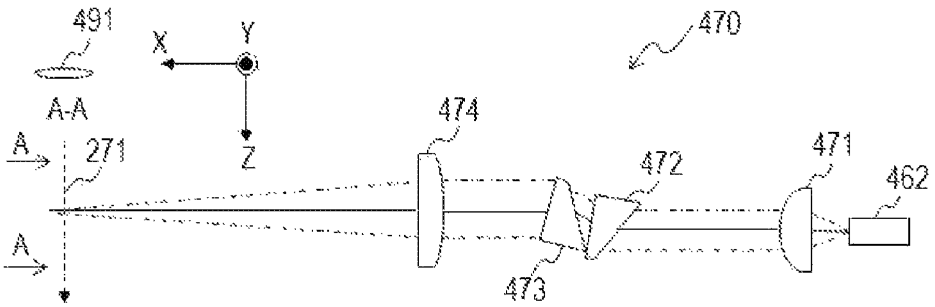
FIG. 16A illustrates a configuration of an illumination optical system.
Figure 16B:
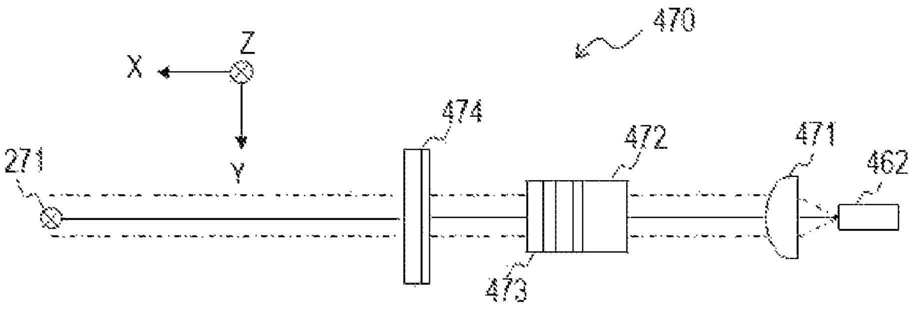
FIG. 16B illustrates a configuration of an illumination optical system.

FIGS. 16A and 16B illustrate a configuration of the illumination optical system 470. FIG. 16A illustrates the illumination optical system 470 as seen in a Y-axis direction and FIG. 16B illustrates the illumination optical system 470 as seen in a Z-axis direction.

The illumination optical system 470 may include a convex lens 471, a prism 472, a prism 473, and a cylindrical convex lens 474 disposed in this order from the input side. The convex lens 471 may be configured to transform the light outputted from the output end 462 of the optical fiber 460 to substantially parallel light.

The prisms 472 and 473 may be configured to expand the beam width of the substantially parallel light in the Z-axis directions. The prisms 472 and 473 may be configured not to expand the beam width of the substantially parallel light in the Y-axis directions. The optical system for expanding the beam width may be a pair of cylindrical concave and convex lenses or a beam expander composed of a pair of cylindrical convex lenses. The cylindrical convex lens 474 may be disposed so that a direction along the central axis of the convex face of the cylindrical convex lens 474 may be substantially the same as a Y-axis direction.

13.3 Operation

The light outputted by the light source 46 may transmit within the optical fiber 460 via the fiber-input optical system 463. The light outputted from the output end 462 of the optical fiber may be transformed into substantially parallel light by the convex lens 471 of the illumination optical system 470, expanded by the prisms 472 and 473 in beam width in the Z-axis directions, and focused by the cylindrical convex lens 474.

The cylindrical convex lens 474 may shape the light expanded in beam width in the Z-axis directions into light having a cross-sectional profile shorter in the Z-axis directions and longer in the Y-axis directions and illuminate the droplet trajectory 271 with the shaped beam.

13.4 Effects

The optical fiber 460 for guiding the light from the light source 46 to the vicinity of the window 21*a* may increase the flexibility in location of the light source 46. The illumination optical system 470 expanding the illumination light in beam width may let the illumination light enter the cylindrical convex lens 474 at a high NA. This configuration may attain a collected beam having a smaller width in the Z-axis directions than a configuration composed of only a single cylindrical lens.

14. Timing Sensor in Embodiment 9

14.1 Overview

The electromagnetic wave generated from plasma may cause a noise in the sensor signal. The passage timing signal may be outputted at an erroneous timing because of the noise. As a result, a situation may happen where a droplet is not properly irradiated with a laser beam. The transfer optical system may prevent optical components included in the electromagnetic wave from entering the light-receiving section. However, the transfer optical system may not be able to sufficiently block the electromagnetic wave other than the light.

Figure 17:
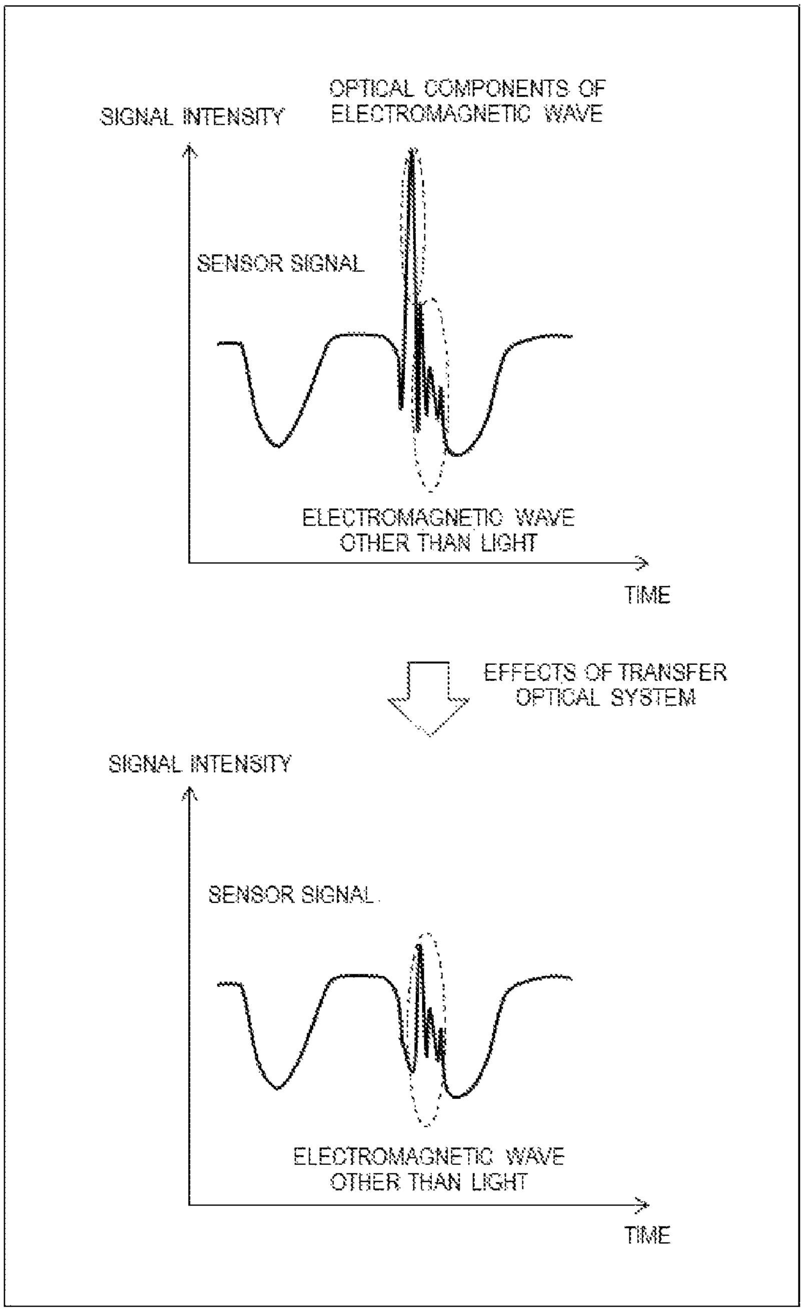
FIG. 17 illustrates temporal variation in a sensor signal including noise.

FIG. 17 illustrates temporal variation in a sensor signal including a noise. The noise may be composed of optical components of the electromagnetic wave caused by plasma and electromagnetic wave other than the light. In the example of FIG. 17, the transfer optical system may sufficiently block the noise of the optical components in the electromagnetic wave but may not sufficiently block the noise of the electromagnetic wave component other than the light.

The inventors conducted spectral analysis on the variation in sensor signal caused by variation in optical intensity reflecting passage of a droplet. As a result, the inventors found that frequency components of 1 to 7 MHz are dominant in the variation in signal caused by variation in optical intensity reflecting passage of a droplet. The same spectral analysis conducted on electromagnetic noise when the sensor signal includes an electromagnetic noise revealed that frequency components of 15 MHz and around 15 MHz are strong.

These results indicate that providing an electric filter configured to pass frequency components including frequency components of 1 to 7 MHz and block transmission of frequency components of 12 to 18 MHz on the sensor signal path is effective. The electric filter provided on the signal path is called line filter. For example, a line filter configured to pass a frequency band of 0.5 to 10 MHz and attenuate a frequency band of 12 to 18 MHz to less than a half may be provided on the sensor signal path.

14.2 Configurations of Line Filter

FIGS. 18A to 18D illustrate examples of circuit configurations of line filters. The line filter may be any one of a lowpass filter (LPF), a bandpass filter (BPF), and a band elimination filter (BEF). The line filter may be a digital filter including a DSP other than the circuits illustrated in FIGS. 18A to 18D.

Figure 18A:
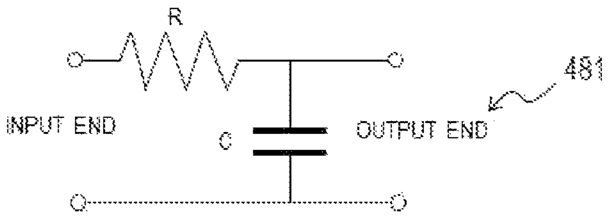
FIG. 18A illustrates an example of a circuit configuration of a line filter.

FIG. 18A illustrates an example 481 of the LPF. The LPF 481 may include a resistor R in series with the input signal and a capacitor C in parallel with the input signal. The resistance of the resistor R and the capacitance of the capacitor C may be configured to pass the frequency band of 0.5 to 10 MHz and attenuate the frequency band of 12 to 18 MHz into less than a half.

Figure 18B:
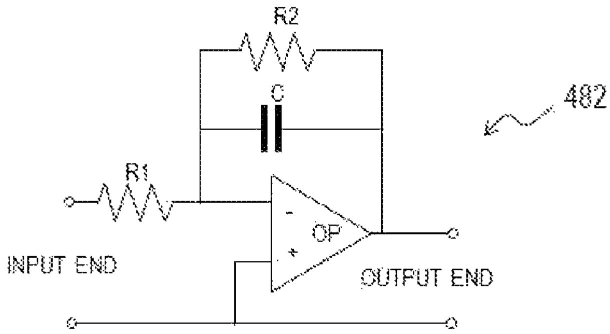
FIG. 18B illustrates an example of a circuit configuration of a line filter.

FIG. 18B illustrates another example 482 of the LPF. The LPF 482 may be an active lowpass filter including an operational amplifier OP. The LPF 482 may include a resistor R1 connected with its input end and the inverting input end of the operational amplifier OP, a resistor R2 connected with the inverting input end of the operational amplifier OP and the output end, and a capacitor C connected with the inverting input end and the output end of the operational amplifier OP. The resistance of the resistor R1, the resistance of the resistor R2, and the capacitance of the capacitor C may be configured to pass the frequency band of 0.5 to 10 MHz and attenuate the frequency band of 12 to 18 MHz into less than a half.

Figure 18C:
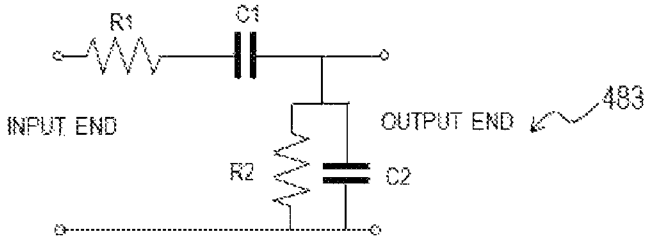
FIG. 18C illustrates an example of a circuit configuration of a line filter.

FIG. 18C illustrates an example 483 of the BPF. The BPF 483 may include a resistor R1 and a capacitor C1 in series with the input signal and a resistor R2 and a capacitor C2 in parallel with the input signal. The resistance of the resistor R1, the resistance of the resistor R2, the capacitance of the capacitor C1, and the capacitance of the capacitor C2 may be set to pass the frequency band of 0.5 to 10 MHz and attenuate the frequency band of 12 to 18 MHz into less than a half.

Figure 18D:
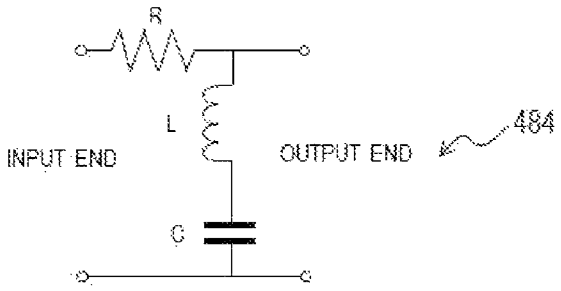
FIG. 18D illustrates an example of a circuit configuration of a line filter.

FIG. 18D illustrates an example 484 of the BEF. The BEF 484 may include a resistor R in series with the input signal and a coil L and a capacitor C in parallel with the input signal. The resistance of the resistor R, the inductance of the coil L, and the capacitance of the capacitor C may be set to pass the frequency band of 0.5 to 10 MHz and attenuate the frequency band of 12 to 18 MHz into less than a half.

14.3 Example of Positions of Line Filters

Figure 19:
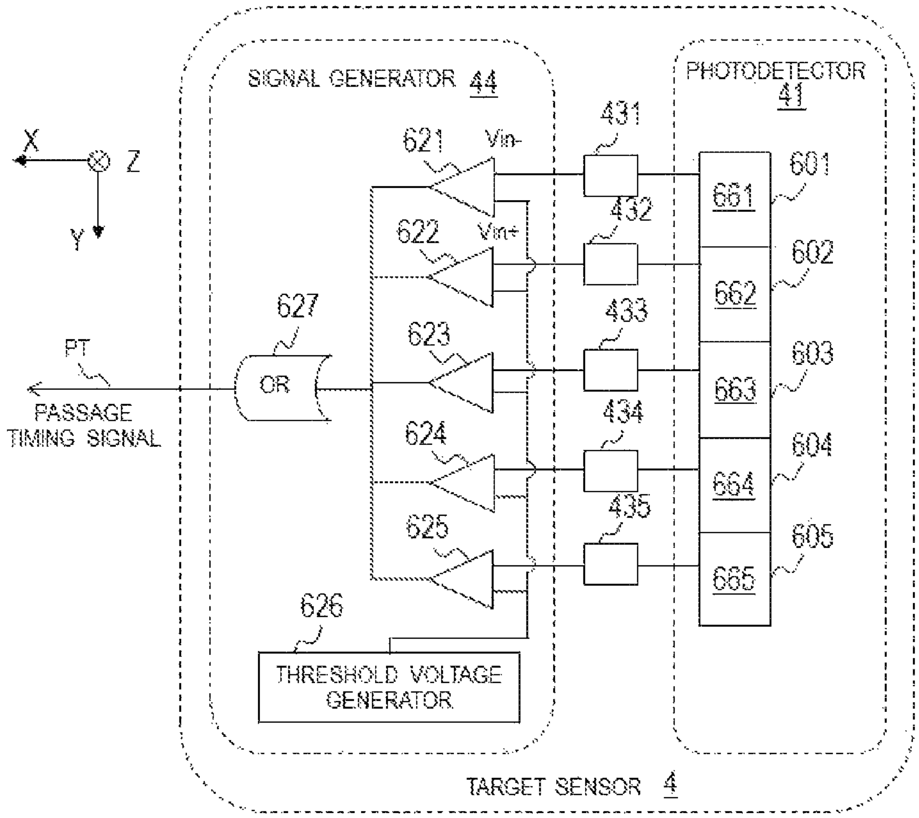
FIG. 19 illustrates a configuration example of a target sensor in Embodiment 9.

FIG. 19 illustrates a configuration example of a target sensor 4 in the present embodiment. The target sensor 4 may include line filters 431 to 435 provided on the sensor signal paths connecting the photodetector 41 and the signal generator 44. The line filter 431 may be provided on the sensor signal path from the sensor element 661 to the comparator 621. The line filter 432 may be provided on the sensor signal path from the sensor element 662 to the comparator 622.

The line filter 433 may be provided on the sensor signal path from the sensor element 663 to the comparator 623. The line filter 434 may be provided on the sensor signal path from the sensor element 664 to the comparator 624. The line filter 435 may be provided on the sensor signal path from the sensor element 665 to the comparator 625.

The line filters 431 to 435 may have the same circuit configuration or different circuit configurations. The line filters 431 to 435 may have one of the circuit configurations illustrated in FIGS. 18A to 18D, for example.

14.4 Another Example of Position of Line Filter

Figure 20:
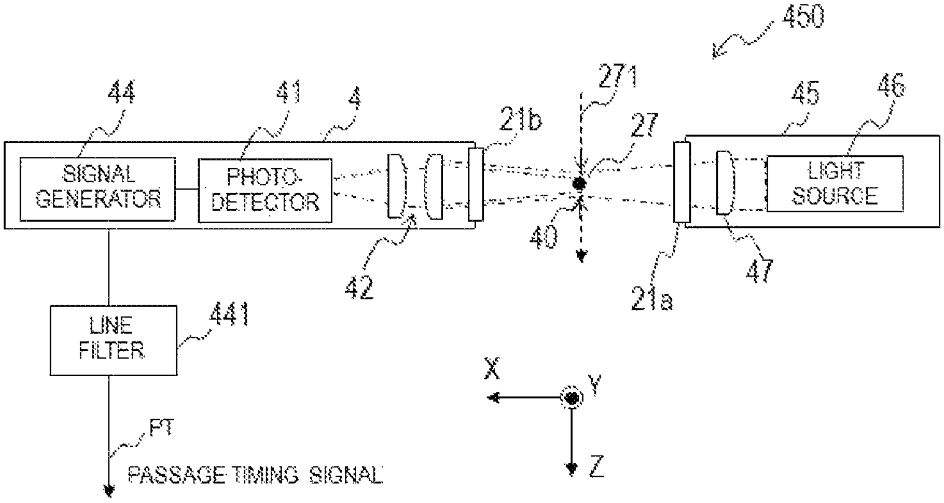
FIG. 20 illustrates a configuration of a timing sensor in Embodiment 9.

FIG. 20 illustrates a configuration of a timing sensor 450 in the present embodiment. The timing sensor 450 may include a combination of a light-receiving optical system 42 of a transfer optical system and a line filter 441. The light-receiving optical system 42 may be a transfer optical system for transferring an image of a droplet trajectory 271 to the light-receiving surface of the photodetector 41.

The line filter 441 may be provided on the signal path of the passage timing signal PT outputted by the signal generator 44. Line filters 431 to 435 may be provided on the sensor signal paths connecting the photodetector 41 and the signal generator 44 as described above.

14.5 Effects

The timing sensor including a line filter having specific filtering characteristics may effectively reduce the noise included in the sensor signal. The timing sensor further including a combination of a transfer optical system and a line filter may reduce the noise included in the sensor signal more effectively. The line filter provided between a sensor element and a comparator may effectively reduce the noise included in an analog signal.

As set forth above, the present invention has been described with reference to embodiments; the scope of the present invention is not to be limited to the foregoing embodiments. A part of the configuration of an embodiment may be replaced with a configuration of another embodiment. A configuration of an embodiment may be incorporated to a configuration of another embodiment. A part of the configuration of each embodiment may be removed, added to a different configuration, or replaced by a different configuration.

The terms used in this specification and the appended claims should be interpreted as "non-limiting". For example, the terms "include" and "be included" should be interpreted as "including the stated elements but not limited to the stated elements". The term "have" should be interpreted as "having the stated elements but not limited to the stated elements". Further, the modifier "one (a/an)" should be interpreted as "at least one" or "one or more."

What is claimed is:

1. An extreme ultraviolet light generation apparatus configured to generate extreme ultraviolet light by irradiating a target with a pulse laser beam outputted from a laser apparatus to generate plasma, the extreme ultraviolet light generation apparatus comprising:

a target supply device configured to supply a target;

a timing sensor configured to detect a target supplied from the target supply device and passing through a predetermined region; and a controller configured to control the laser apparatus in accordance with a signal indicating detection of the target and received from the timing sensor, wherein the timing sensor includes:

a light-emitting unit configured to illuminate the predetermined region with illumination light; and a target sensor configured to receive the illumination light from the light-emitting unit, wherein the target sensor includes:

a plurality of sensor elements, each of the plurality of sensor elements being configured to output a sensor signal that varies in accordance with an amount of light received on a light-receiving surface; and a signal generator configured to process the sensor signals from the plurality of sensor elements, wherein the light-receiving surfaces of the plurality of sensor elements are disposed at different positions in a second direction different from a first direction along which an image of the target illuminated by the illumination light moves, and wherein the signal generator is configured to compare each of the sensor signals from the plurality of sensor elements with a threshold and output the signal indicating detection of a target to the controller in a case where at least one of the sensor signals from the plurality of sensor elements exceeds the threshold.

2. The extreme ultraviolet light generation apparatus according to claim 1, wherein the signal generator includes:

a plurality of comparators associated with the plurality of sensor elements in one-to-one correspondence, each of the plurality of comparators being configured to receive the sensor signal from the associated sensor element;

a threshold generation unit configured to provide a threshold to each of the plurality of comparators; and an OR circuit configured to receive outputs of the plurality of comparators.

3. The extreme ultraviolet light generation apparatus according to claim 1, wherein the plurality of sensor elements constitute a first sensor element array, wherein the target sensor further includes a plurality of sensor elements constituting a second sensor element array, wherein the light-receiving surfaces of the sensor elements of the first sensor element array are joined in a row in the second direction, wherein the light-receiving surfaces of the sensor elements of the second sensor element array are joined in a row in the second direction and disposed at different positions in the first direction from the light-receiving surfaces of the sensor elements of the first sensor element array, wherein the joining parts of the light-receiving surfaces in the first sensor element array are located at different positions in the second direction from the joining parts of the light-receiving surfaces in the second sensor element array, and wherein the signal generator is configured to compare each of the sensor signals from the sensor elements of the first sensor element array and the second sensor element array with a threshold and output the signal indicating detection of a target to the controller in a case where at least one of the sensor signals from the sensor elements is higher than the threshold.

4. The extreme ultraviolet light generation apparatus according to claim 3, wherein the signal generator includes a delay circuit configured to adjust a difference in detection timing of a same target between the first sensor element array and the second sensor element array.

5. The extreme ultraviolet light generation apparatus according to claim 3, wherein the timing sensor includes an optical system configured to split the illumination light from the light-emitting unit to provide the split illumination light beams to the first sensor element array and the second sensor element array.

6. The extreme ultraviolet light generation apparatus according to claim 5, wherein an optical path of the one of the split illumination light beams to the first sensor element array has substantially the same length as an optical path of the other of the split illumination light beams to the second sensor element array.

7. The extreme ultraviolet light generation apparatus according to claim 1, wherein the target sensor includes an optical system configured to split illumination light from the light-emitting unit and provide the split illumination light beams to the light-receiving surfaces of the plurality of sensor elements at different positions in the second direction.

8. The extreme ultraviolet light generation apparatus according to claim 1, wherein the plurality of sensor elements are configured to detect an image of a shadow of the target in the illumination light from the light-emitting unit, and wherein the timing sensor includes a slit configured to limit a range to receive light on the light-receiving surfaces in such a manner that differences in amount of illumination light received from the light-emitting unit are small among the light-receiving surfaces of the plurality of sensor elements.

9. The extreme ultraviolet light generation apparatus according to claim 1, wherein the signal generator is configured to use different thresholds in accordance with illumination light profiles on the light-receiving surfaces of the plurality of sensor elements.

10. The extreme ultraviolet light generation apparatus according to claim 1, wherein the light-emitting unit includes an optical system configured to shape illumination light to have a cross-section profile expanded in the second direction.

11. The extreme ultraviolet light generation apparatus according to claim 1, wherein the target sensor includes an optical system configured to transfer an image of illumination light of which a cross-section profile is longer in the second direction than in the first direction to the light-receiving surfaces of the plurality of sensor elements.

12. The extreme ultraviolet light generation apparatus according to claim 2, wherein the target sensor includes line filters disposed between the plurality of sensor elements and the plurality of comparators.

13. An extreme ultraviolet light generation apparatus configured to generate extreme ultraviolet light by irradiating a target with a pulse laser beam outputted from a laser apparatus to generate plasma, the extreme ultraviolet light generation apparatus comprising:

a target supply device configured to supply a target;

a timing sensor configured to detect a target supplied from the target supply device and passing through a predetermined region; and a controller configured to control the laser apparatus in accordance with a signal indicating detection of the target and received from the timing sensor, wherein the timing sensor includes:

a light-emitting unit configured to illuminate the predetermined region with illumination light; and a target sensor configured to receive the illumination light from the light-emitting unit, wherein the target sensor includes:

a plurality of sensor elements, each of the plurality of sensor elements being configured to output a sensor signal that varies in accordance with an amount of light received on a light-receiving surface; and a signal generator configured to process the sensor signals from the plurality of sensor elements, wherein the light-receiving surfaces of the plurality of sensor elements are disposed at different positions in a second direction different from a first direction along which an image of the target illuminated by the illumination light moves, wherein the signal generator is configured to compare each of the sensor signals from the plurality of sensor elements with a threshold and output the signal indicating detection of a target to the controller in a case where at least one of the sensor signals from the plurality of sensor elements exceeds the threshold, wherein the light-emitting unit includes an optical system configured to shape the illumination light to have a cross-section profile longer in the second direction than in the first direction, and wherein the target sensor includes an optical system configured to transfer an image of the illumination light of which the cross-section profile is longer in the second direction than in the first direction to over the light-receiving surfaces of the plurality of sensor elements.

14. The extreme ultraviolet light generation apparatus according to claim 13, wherein the signal generator includes:

a plurality of comparators associated with the plurality of sensor elements in one-to-one correspondence, each of the plurality of comparators being configured to receive the sensor signal of the associated sensor element;

a threshold generation unit configured to provide a threshold to each of the plurality of comparators; and an OR circuit configured to receive outputs of the plurality of comparators.

15. The extreme ultraviolet light generation apparatus according to claim 13, wherein the plurality of sensor elements constitute a first sensor element array, wherein the target sensor further includes a plurality of sensor elements constituting a second sensor element array, wherein the light-receiving surfaces of the sensor elements of the first sensor element array are joined in a row in the second direction, wherein the light-receiving surfaces of the sensor elements of the second sensor element array are joined in a row in the second direction and disposed at different positions in the first direction from the light-receiving surfaces of the sensor elements of the first sensor element array, wherein the joining parts of the light-receiving surfaces in the first sensor element array are located at different positions in the second direction from the joining parts of the light-receiving surfaces in the second sensor element array, and wherein the signal generator is configured to compare each of the sensor signals from the sensor elements of the first sensor element array and the second sensor element array with a threshold and output the signal indicating detection of a target to the controller in a case where at least one of the sensor signals from the sensor elements is higher than the threshold.

16. The extreme ultraviolet light generation apparatus according to claim 15, wherein the signal generator includes a delay circuit configured to adjust a difference in detection timing of a same target between the first sensor element array and the second sensor element array.

17. The extreme ultraviolet light generation apparatus according to claim 15, wherein the timing sensor includes an optical system configured to split the illumination light from the light-emitting unit to provide the split illumination light beams to the first sensor element array and the second sensor element array.

18. The extreme ultraviolet light generation apparatus according to claim 17, wherein an optical path of the one of the split illumination light beams to the first sensor element array has substantially the same length as an optical path of the other of the split illumination light beams to the second sensor element array.

19. The extreme ultraviolet light generation apparatus according to claim 13, wherein the target sensor includes an optical system configured to split illumination light from the light-emitting unit and provide the split illumination light beams to the light-receiving surfaces of the plurality of sensor elements at different positions in the second direction.

20. The extreme ultraviolet light generation apparatus according to claim 13, wherein the plurality of sensor elements are configured to detect an image of a shadow of the target in the illumination light from the light-emitting unit, and wherein the timing sensor includes a slit configured to limit a range to receive light on the light-receiving surfaces in such a manner that differences in amount of illumination light received from the light-emitting unit are small among the light-receiving surfaces of the plurality of sensor elements.

21. The extreme ultraviolet light generation apparatus according to claim 14, wherein the target sensor includes line filters disposed between the plurality of sensor elements and the plurality of comparators.

* * * * *